US012439236B2

(12) United States Patent
Geng et al.

(10) Patent No.: US 12,439,236 B2
(45) Date of Patent: Oct. 7, 2025

(54) COMMUNICATION METHOD AND COMMUNICATION APPARATUS

(71) Applicant: HUAWEI TECHNOLOGIES CO., LTD., GuangDong (CN)

(72) Inventors: Tingting Geng, Shanghai (CN); Le Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 333 days.

(21) Appl. No.: 17/961,948

(22) Filed: Oct. 7, 2022

(65) Prior Publication Data
US 2023/0035795 A1 Feb. 2, 2023

Related U.S. Application Data

(63) Continuation of application No. PCT/CN2021/086135, filed on Apr. 9, 2021.

(30) Foreign Application Priority Data

Apr. 10, 2020 (CN) .......................... 202010280792.8

(51) Int. Cl.
*H04W 8/02* (2009.01)
(52) U.S. Cl.
CPC .................................... *H04W 8/02* (2013.01)
(58) Field of Classification Search
CPC ........... H04W 8/00; H04W 8/02; H04W 8/08; H04W 8/18; H04W 8/183; H04W 8/20;
(Continued)

(56) References Cited

U.S. PATENT DOCUMENTS

2012/0014357 A1\* 1/2012 Jung ............... H04W 36/00835
370/332
2016/0212595 A1\* 7/2016 Fukuta .................... H04W 4/06
(Continued)

FOREIGN PATENT DOCUMENTS

CN 105722213 A 6/2016
CN 110913496 A 3/2020
(Continued)

OTHER PUBLICATIONS

3GPP TSG-RAN WG2 Meeting #108, R2-1915857, "Discussion on remaining aspects on MDT and mobility history information in MR-DC," Huawei, HiSilicon, Reno, Nevada, USA, Nov. 18-22, 2019; 7 total pages.
CATT: "Failure Indication about SCG", 3GPP Draft; R2-2000102; Feb. 14, 2020; XP051848799,total 3 pages.
Nokia et al: "Further discussion on MRO for SN change failure", 3GPP Draft; R3-200074; Feb. 14, 2020; XP051853884,total 9 pages.
(Continued)

*Primary Examiner* — Matthew W Genack
(74) *Attorney, Agent, or Firm* — Rimon PC

(57) ABSTRACT

In a multiple connectivity mobility scenario, a terminal device records information related to a secondary network device (SN) mobility process to generate a mobility report, and sends the mobility report to a network device. The network device determines, based on the content in the mobility report, whether a mobility parameter related to the SN mobility needs to be adjusted. If the mobility parameter needs to be adjusted, the network device performs proper adjustment, thereby improving the robustness of the terminal device's secondary network device mobility.

20 Claims, 8 Drawing Sheets

(58) Field of Classification Search
CPC ..... H04W 8/22; H04W 8/24; H04W 36/0055; H04W 36/0069; H04W 36/00692
See application file for complete search history.

(56) References Cited

U.S. PATENT DOCUMENTS

| | | | | |
|---|---|---|---|---|
| 2018/0376457 | A1* | 12/2018 | Tseng | H04W 76/12 |
| 2019/0104507 | A1* | 4/2019 | Majmundar | H04W 36/06 |
| 2020/0329405 | A1* | 10/2020 | Awoniyi-Oteri | H04W 36/0027 |

FOREIGN PATENT DOCUMENTS

| | | |
|---|---|---|
| WO | 2016179812 A1 | 11/2016 |
| WO | 2018228560 A1 | 12/2018 |
| WO | 2020029936 A1 | 2/2020 |

OTHER PUBLICATIONS

Samsung: "(TP for SON BL CR for TS 38.423) XnAP impacts for the solution of SN change failure", 3GPP Draft; R3-197137; Nov. 8, 2019; XP051820763,total 14 pages.
ZTE: "Detection solution for SN change failure", 3GPP Draft; R3-200612; Feb. 14, 2020; XP051854139,total 5 pages.
CATT (Rapporteur), Output of Email Discussion [107#45][NRSON] RACH and Mobility Robustness Optimisation Checking. 3GPP TSG-RAN WG2 Meeting #107bis, Chongqing, P.R.China, Oct. 14-18, 2019, R2-1912147, 38 pages.
Huawei, LGU+, (TP for SON BL CR for TS 38.300): additional MRO features. 3GPP TSG-RAN3 Meeting #105bis, Chongqing, China, Oct. 14-18, 2019, R3-195413, 9 pages.

* cited by examiner

COMMUNICATION METHOD AND COMMUNICATION APPARATUS

CROSS-REFERENCE TO RELATED APPLICATIONS

This application is a continuation of International Application No. PCT/CN2021/086135, filed on Apr. 9, 2021, which claims priority to Chinese Patent Application No. 202010280792.8, filed on Apr. 10, 2020. The disclosures of the aforementioned applications are hereby incorporated by reference in their entireties.

TECHNICAL FIELD

This application relates generally to the communication field, and specifically, to a communication method and a communication apparatus.

BACKGROUND

In a dual connectivity (DC) application scenario in the communication technology field, data communication may be performed between a core network and a terminal device via two base stations: a master base station or a master network device (MN) and a secondary base station or a secondary network device (SN). In the DC scenario, an SN-related mobility scenario of a terminal device is complicated. Currently, no technology can be used to identify a potential failure in an SN mobility process.

SUMMARY

This application provides a communication method and a communication apparatus. A terminal device records an SN mobility report, so that a network device can identify a potential failure in the terminal device's SN mobility process, thereby improving the robustness of SN mobility.

According to a first aspect, a communication method is provided. The method may include: recording a mobility report, where the mobility report includes information related to secondary network device mobility of a terminal device; and sending the mobility report, where the secondary network device mobility includes configuring the terminal device to add a target secondary network device and/or configuring the terminal device to change a secondary network device from a source secondary network device to a target secondary network device.

In the foregoing technical solution, the report related to the secondary network device mobility is recorded, so that after receiving the report, the network device can identify a problem in an SN mobility process based on content in the report, thereby improving robustness of the SN mobility. It may be understood that the method may be implemented by the terminal device, or may be implemented by a component (for example, a chip or a circuit) that is disposed in the terminal device.

It should be understood that the network device herein may be a master network device or a secondary network device of the terminal device.

With reference to the first aspect, in some implementations of the first aspect, before the mobility report is recorded, first indication information is received by the terminal device, where the first indication information indicates to the terminal device to record the mobility report.

With reference to the first aspect, in some implementations of the first aspect, the first indication information indicates configuration information for triggering recording of the mobility report, where the configuration information includes at least one of the following parameters: a quality difference threshold, a quality threshold, a random access power threshold, and a random access preamble transmission quantity threshold.

In the foregoing technical solution, the terminal device receives the first indication information, and determines, based on the at least one of the parameters in the configuration information in the first indication information, whether to record the mobility report. This reduces energy consumption of the terminal device due to recording mobility reports in unnecessary scenarios by the terminal device and signaling overheads for subsequently transmitting the reports.

With reference to the first aspect, in some implementations of the first aspect, the recording a mobility report includes: recording the mobility report in a case that it is determined that an absolute value of a quality difference between a cell quality, corresponding to a first moment, of a cell of the target secondary network device and a cell quality, corresponding to a second moment, of the cell is greater than or equal to the quality difference threshold; recording the mobility report in a case that it is determined that an absolute value of a quality difference between the cell quality, corresponding to a first moment, of a cell of the source secondary network device and the cell quality, corresponding to a second moment, of the cell is greater than or equal to the quality difference threshold; recording the mobility report in a case that it is determined that a cell quality of the cell of the target secondary network device at a third moment is less than or equal to the quality threshold; recording the mobility report in a case that it is determined that random access power for the target secondary network device is greater than or equal to the random access power threshold; and/or recording the mobility report in a case that it is determined that a quantity of random access preamble transmissions in a process of accessing the target secondary network device is greater than or equal to the random access preamble transmission quantity threshold.

In the foregoing technical solution, a trigger mechanism for recording the mobility report by the terminal device is introduced, to reduce energy consumption of the terminal device caused by recording a mobility report in any scenario by the terminal device and signaling overheads for subsequently transmitting the report.

With reference to the first aspect, in some implementations of the first aspect, the first moment and the second moment include any two of the following moments: a moment at which the terminal device reports the cell quality of the cell of the target secondary network device; a moment at which the terminal device receives a secondary network device mobility configuration, where the secondary network device mobility configuration includes configuration information indicating to the terminal device to add the target secondary network device, or the secondary network device mobility configuration includes configuration information indicating to the terminal device to change the secondary network device from the source secondary network device to the target secondary network device; a moment at which the terminal device sends a secondary network device mobility configuration complete message; and a moment at which the terminal device completes random access to the target secondary network device; and the third moment includes one of the following moments: the moment at which the terminal device receives the secondary network device mobility configuration; the moment at which the terminal device sends the secondary network device mobility configuration complete message; and the moment at which the terminal device completes random access to the target secondary network device.

With reference to the first aspect, in some implementations of the first aspect, after the mobility report is recorded, second indication information is sent, where the second indication information indicates that the mobility report is stored.

With reference to the first aspect, in some implementations of the first aspect, request information is received, where the request information requests to report the mobility report. The sending the mobility report includes: sending the mobility report based on the request information.

According to a second aspect, a communication method is provided. The method includes: receiving, by a master network device, a mobility report, where the mobility report includes information related to secondary network device mobility of a terminal device, and the secondary network device mobility includes configuring the terminal device to add a target secondary network device and/or configuring the terminal device to change a secondary network device from a source secondary network device to a target secondary network device; and configuring, by the master network device, a related parameter of the secondary network device mobility based on the mobility report, or sending, by the master network device, the mobility report to the source secondary network device.

In the foregoing technical solution, the master network device receives the mobility report, so that after receiving the report, a network device can identify a problem in an SN mobility process based on the related information in the report, thereby improving robustness of the SN mobility.

With reference to the second aspect, in some implementations of the second aspect, before the master network device receives the mobility report, the master network device sends first indication information, where the first indication information indicates to the terminal device to record the mobility report.

With reference to the second aspect, in some implementations of the second aspect, the first indication information indicates configuration information for triggering the terminal device to record the mobility report, where the configuration information includes at least one of the following parameters: a quality difference threshold, a quality threshold, a random access power threshold, and a random access preamble transmission quantity threshold.

In the foregoing technical solution, the master network device sends the first indication information, so that the terminal device can determine, based on the parameter in the configuration information in the first indication information, whether to record the mobility report. This reduces energy consumption of the terminal device caused by recording a mobility report in any scenario by the terminal device and signaling overheads for subsequently transmitting the report.

With reference to the second aspect, in some implementations of the second aspect, the master network device receives the configuration information from a secondary network device.

With reference to the second aspect, in some implementations of the second aspect, the receiving, by a master network device, a mobility report includes: receiving, by the master network device, second indication information, where the second indication information indicates that the terminal device has stored the mobility report; sending, by the master network device, request information, where the request information requests the terminal device to report the mobility report; and receiving, by the master network device, the mobility report from the terminal device.

With reference to the second aspect, in some implementations of the second aspect, the receiving, by a master network device, a mobility report includes: receiving, by the master network device, the mobility report sent by a first network device, where the first network device is a network device that receives the mobility report sent by the terminal device.

According to a third aspect, a communication method is provided. The method includes: receiving, by a source secondary network device, a mobility report, where the mobility report includes information related to secondary network device mobility of a terminal device; and configuring, by the source secondary network device, a related parameter of the secondary network device mobility based on the mobility report, where the secondary network device mobility includes configuring the terminal device to add a target secondary network device and/or configuring the terminal device to change a secondary network device from the source secondary network device to a target secondary network device.

In the foregoing technical solution, the source secondary network device receives the mobility report, so that after receiving the report, the source secondary network device can identify a problem in an SN mobility process based on the related information in the report, thereby improving robustness of the SN mobility.

With reference to the third aspect, in some implementations of the third aspect, before the source secondary network device receives the mobility report, the source secondary network device sends a first request message, where the first request message includes information indicating a master network device to configure first indication information, and the first indication information indicates to the terminal device to record the mobility report.

With reference to the third aspect, in some implementations of the third aspect, the first indication information indicates configuration information for triggering the terminal device to record the mobility report, where the configuration information includes at least one of the following parameters: a quality difference threshold, a quality threshold, a random access power threshold, and a random access preamble transmission quantity threshold.

With reference to the third aspect, in some implementations of the third aspect, the source secondary network device sends the configuration information to the master network device.

With reference to the third aspect, in some implementations of the third aspect, the receiving, by a source secondary network device, a mobility report includes: receiving, by the source secondary network device, the mobility report sent by the terminal device; receiving, by the source secondary network device, a mobility report sent by the master network device; or receiving, by the source secondary network device, a mobility report sent by a first network device, where the first network device is a network device to which the terminal device sends the mobility report.

According to a fourth aspect, a communication apparatus is provided. The communication apparatus has a function of implementing the method according to the first aspect or any possible implementation of the first aspect. The function may be implemented by hardware, or may be implemented by hardware executing corresponding software. The hardware or the software includes one or more units corresponding to the foregoing function.

According to a fifth aspect, a communication apparatus is provided. The communication apparatus has a function of implementing the method according to the second aspect or any possible implementation of the second aspect. The function may be implemented by hardware, or may be implemented by hardware executing corresponding software. The hardware or the software includes one or more units corresponding to the foregoing function.

According to a sixth aspect, a communication apparatus is provided. The communication apparatus has a function of implementing the method according to the third aspect or any possible implementation of the third aspect. The function may be implemented by hardware, or may be implemented by hardware executing corresponding software. The hardware or the software includes one or more units corresponding to the foregoing function.

According to a seventh aspect, a communication apparatus is provided, and includes a processor. The processor is coupled to a memory, and may be configured to read and execute instructions in the memory, to implement the communication method according to the first aspect or any possible implementation of the first aspect. Optionally, the communication apparatus further includes the memory. Optionally, the communication apparatus further includes a communication interface, the processor is coupled to the communication interface, and the communication interface is configured to input and/or output information. The information includes at least one of the instructions and data.

In an implementation, the communication apparatus is a terminal device. When the communication apparatus is a terminal device, the communication interface may be a transceiver or an input/output interface.

In another implementation, the communication apparatus is a chip or a chip system. When the communication apparatus is a chip or a chip system, the communication interface may be an input/output interface, or may be an input/output interface, an interface circuit, an output circuit, an input circuit, a pin, a related circuit, or the like on the chip or the chip system. The processor may alternatively be embodied as a processing circuit or a logic circuit.

In another implementation, the communication apparatus is a chip or a chip system disposed in a terminal device.

Optionally, the transceiver may be a transceiver circuit. Optionally, the input/output interface may be an input/output circuit.

According to an eighth aspect, a communication apparatus is provided, and includes a processor. The processor is coupled to a memory, and may be configured to read and execute instructions in the memory, to implement the communication method according to the second aspect or any possible implementation of the second aspect. Optionally, the communication apparatus further includes the memory. Optionally, the communication apparatus further includes a communication interface, the processor is coupled to the communication interface, and the communication interface is configured to input and/or output information. The information includes at least one of the instructions and data.

In an implementation, the communication apparatus is a master network device. When the communication apparatus is a master network device, the communication interface may be a transceiver or an input/output interface.

In another implementation, the communication apparatus is a chip or a chip system. When the communication apparatus is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

In another implementation, the communication apparatus is a chip or a chip system disposed in a master network device.

Optionally, the transceiver may be a transceiver circuit. Optionally, the input/output interface may be an input/output circuit.

According to a ninth aspect, a communication apparatus is provided, and includes a processor. The processor is coupled to a memory, and may be configured to read and execute instructions in the memory, to implement the communication method according to the third aspect or any possible implementation of the third aspect. Optionally, the communication apparatus further includes the memory. Optionally, the communication apparatus further includes a communication interface, the processor is coupled to the communication interface, and the communication interface is configured to input and/or output information. The information includes at least one of the instructions and data.

In an implementation, the communication apparatus is a source secondary network device. When the communication apparatus is a source secondary network device, the communication interface may be a transceiver or an input/output interface.

In another implementation, the communication apparatus is a chip or a chip system. When the communication apparatus is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

In another implementation, the communication apparatus is a chip or a chip system disposed in a source secondary network device.

Optionally, the transceiver may be a transceiver circuit. Optionally, the input/output interface may be an input/output circuit.

According to a tenth aspect, a computer program product is provided. The computer program product includes a computer program (which may also be referred to as code or instructions). When the computer program is run, a computer is enabled to perform the method according to the first aspect and any possible implementation of the first aspect.

According to an eleventh aspect, a computer program product is provided. The computer program product includes a computer program (which may also be referred to as code or instructions). When the computer program is run, a computer is enabled to perform the method according to the second aspect and any possible implementation of the second aspect.

According to a twelfth aspect, a computer program product is provided. The computer program product includes a computer program (which may also be referred to as code or instructions). When the computer program is run, a computer is enabled to perform the method according to the third aspect and any possible implementation of the third aspect.

According to a thirteenth aspect, a computer-readable storage medium is provided. The computer-readable storage medium stores a computer program (which may also be referred to as code or instructions). When the computer program is run on a computer, the computer is enabled to perform the method according to the first aspect and any possible implementation of the first aspect.

According to a fourteenth aspect, a computer-readable storage medium is provided. The computer-readable storage medium stores a computer program (which may also be referred to as code or instructions). When the computer program is run on a computer, the computer is enabled to perform the method according to the second aspect and any possible implementation of the second aspect.

According to a fifteenth aspect, a computer-readable storage medium is provided. The computer-readable storage medium stores a computer program (which may also be referred to as code or instructions). When the computer program is run on a computer, the computer is enabled to perform the method according to the third aspect and any possible implementation of the third aspect.

According to a sixteenth aspect, this application provides a chip. The chip includes a processor and a communication interface. The communication interface is configured to receive a signal and transmit the signal to the processor, and the processor processes the signal, so that the method according to any one of the first aspect or the possible implementations of the first aspect is performed.

According to a seventeenth aspect, this application provides a chip. The chip includes a processor and a communication interface. The communication interface is configured to receive a signal and transmit the signal to the processor, and the processor processes the signal, so that the method according to any one of the second aspect or the possible implementations of the second aspect is performed, or the method according to any one of the second aspect or the possible implementations of the second aspect is performed.

According to an eighteenth aspect, this application provides a chip. The chip includes a processor and a communication interface. The communication interface is configured to receive a signal and transmit the signal to the processor, and the processor processes the signal, so that the method according to any one of the third aspect or the possible implementations of the third aspect is performed, or the method according to any one of the third aspect or the possible implementations of the third aspect is performed.

According to a nineteenth aspect, a communication system is provided. The system includes one or more of the master network device, the source secondary network device, the target secondary network device, and the terminal device described above.

DESCRIPTION OF EMBODIMENTS

Figure 1:
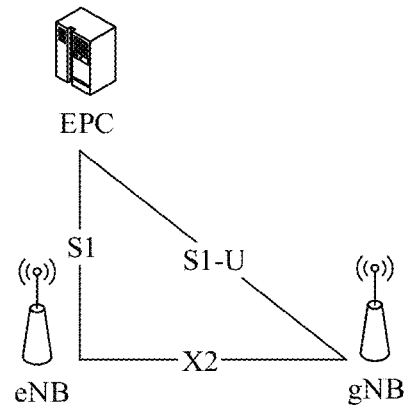
FIG. 1 is a schematic diagram of an EN-DC deployment scenario.

The following describes technical solutions of this application with reference to accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunication system (UMTS), a fifth generation (5th generation, 5G) system such as a new radio (NR) system, a satellite communication system, and another future evolved communication system.

In embodiments of this application, a network device may be any device having a wireless transceiver function. The network device includes but is not limited to an evolved NodeB (eNB), a radio network controller (RNC), a NodeB (NB), a home NodeB (for example, home evolved NodeB, HeNB, or home NodeB, HNB), a baseband unit (BBU), an access point (AP) in a wireless fidelity (wireless fidelity, Wi-Fi) system, a wireless relay node, a wireless backhaul node, a transmission point (TP), or a transmission reception point (TRP), or may be a gNB or a transmission point (TRP or TP) in a 5G system (for example, NR), one antenna panel or a group of antenna panels (including a plurality of antenna panels) of a base station in a 5G system, or a network node that constitutes a gNB or a transmission point, for example, a baseband unit (BBU) or a distributed unit (DU). The network device in embodiments of this application may also be referred to as an access network device.

The network device in embodiments of this application may also be a centralized unit (CU) or a distributed unit (DU), or the network device may include a CU and a DU. It may be understood that a base station is divided into a CU and a DU from a perspective of a logical function. The CU and the DU may be physically separated, or may be deployed together. This is not specifically limited in embodiments of this application. One CU may be connected to one DU, or a plurality of DUs may share one CU to reduce costs and facilitate network expansion. The CU and the DU may be split based on a protocol stack. In a possible manner, a radio resource control (RRC) layer, a service data adaptation protocol stack (SDAP) layer, and a packet data convergence protocol (PDCP) layer are deployed on the CU. A radio link control (RLC) layer, a media access control (MAC) layer, and a physical layer are deployed on the DU. The foregoing protocol stack splitting manner is not completely limited in the present invention, and there may be another splitting manner. For details, refer to TR38.801 v14.0.0. The CU is connected to the DU through an F1 interface. Serving as the gNB, the CU is connected to a core network through an Ng interface.

The network device in embodiments of this application may alternatively be a centralized unit-control plane (CU-CP) node or a centralized unit-user plane (CU-UP) node, or the network device may include a CU-CP and a CU-UP. The CU-CP is responsible for a control plane function, and mainly includes RRC and PDCP-C. The PDCP-C is mainly responsible for data encryption and decryption, integrity protection, data transmission, and the like on a control plane. The CU-UP is responsible for user plane functions, and mainly includes SDAP and PDCP-U. The SDAP is mainly responsible for processing data of the core network and mapping a flow to a bearer. The PDCP-U is mainly responsible for encryption and decryption, integrity protection, header compression, serial number maintenance, data transmission, and the like on a data plane. The CU-CP is connected to the CU-UP through an E1 interface. Serving as the gNB, the CU-CP is connected to the core network through the Ng interface, and is connected to the DU through an F1-C (control plane) interface. The CU-UP is connected to the DU through an F1-U (user plane) interface. Certainly, in another possible implementation, the PDCP-C is also in the CU-UP.

It should be noted that the CU may be classified as an access network device, or may be classified as a core network (CN) device. This is not limited in this application. In embodiments of this application, for ease of understanding and description, the CU is classified as an access network device.

The network device provides a service in a cell. A terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell (small cell). Small cells herein may include a metro cell, a micro cell, a pico cell, a femto cell, and the like. These small cells are characterized by small coverage and low transmit power, and are applicable to providing a high rate data transmission service.

In embodiments of this application, the terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (pad), a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a non-public network, or the like.

The wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, the terminal device may alternatively be a terminal device in an internet of things (IoT) system. An IoT is an important part of future information technology development. A main technical feature of the IoT is to connect things to a network by using a communication technology, to implement an intelligent network for human-machine interconnection and thing-thing interconnection.

In embodiments of this application, a core network device may be a device in a core network (CN) that provides service support for the terminal. Currently, some examples of the core network device are: an access and mobility management function (AMF) entity, a session management function (SMF) entity, a user plane function (UPF) entity, and the like. The AMF entity may be responsible for access management and mobility management of the terminal. The SMF entity may be responsible for session management, for example, session establishment of a user. The UPF entity may be a functional entity on a user plane, and is mainly responsible for a connection to an external network. It should be noted that an entity in this application may also be referred to as a network element or a functional entity. For example, the AMF entity may also be referred to as an AMF network element or an AMF functional entity. For another example, the SMF entity may also be referred to as an SMF network element or an SMF functional entity.

A specific form of the terminal device is not limited in this application.

To facilitate understanding of embodiments of this application, the following first briefly describes terms used in this application.

1. Cell: The cell is described from a perspective of a higher layer, that is, from a perspective of resource management, mobility management, or a service unit. Coverage of each network device may be divided into one or more cells. In addition, each cell may correspond to one or more frequencies, in other words, each cell may be considered as an area formed by coverage of the one or more frequencies. The cell may be an area within a coverage area of a wireless network of the network device.

2. Handover (HO): In a wireless communication system, when a terminal device moves from a cell to another cell or approaches another cell, handover may be performed to ensure that communication of the terminal device is not interrupted.

3. Random access: Random access is a process from a moment at which a terminal device starts to attempt to send a random access preamble to a network device attempting to access a network to a moment at which a basic signaling connection is established to the network. A random access procedure may be performed in a handover procedure, an RRC re-establishment procedure, or the like.

4. Secondary base station mobility: In a wireless communication system, dual connectivity (DC) may be configured for a terminal device, and the terminal device may separately establish connections to a master base station and a secondary base station. When single connectivity is configured for the terminal device, a current serving base station may configure the terminal device to add a secondary base station, that is, configure dual connectivity for the terminal device. In this case, a source serving base station may be referred to as a master base station or a source master base station, and a secondary base station may be referred to as a source secondary base station. When a master base station of a terminal device remains unchanged, a secondary base station of the terminal device may be changed, or the secondary base station of the terminal device may be switched. The change or switching of the secondary base station may be triggered by the master base station, or may be triggered by the source secondary base station. The secondary base station may be a base station, a DU, or another network device.

Embodiments of this application are mainly described for a multiple connectivity (MC) scenario. For ease of understanding, the following uses an example in which multiple connectivity MC includes dual connectivity, that is, an example of a DC scenario, to describe several deployment scenarios of dual connectivity. It should be noted that in embodiments of this application, multiple connectivity may also be referred to as multi-connectivity, and dual connectivity may also be referred to as dual-connectivity.

An overall architecture of the 5G wireless communication system includes a 5GC (also referred to as a 5G Core, a 5GCN, or a 5G core network) and an NG-RAN (also referred to as a 5G-RAN or the like). The 5GC is a core network of the 5G wireless communication system, and the NG-RAN is a radio access network (RAN) of the 5G wireless communication system. The NG-RAN includes two types of RAN nodes: a gNB and an ng-eNB. The gNB provides terminations of user-plane and control-plane protocol stacks of new radio (NR) for the terminal device. The ng-eNB provides terminations of user-plane and control-plane protocol stacks of evolved universal terrestrial radio access (E-UTRA) for the terminal device. Multi-radio dual connectivity (MR-DC) is important for the 5G wireless communication system.

DC may include a plurality of combinations of EN-DC and MR-DC. Main differences lie in core networks and message names in involved signaling procedures.

FIG. 1 is a schematic diagram of an EN-DC deployment scenario. In the EN-DC (E-UTRA NR DC) scenario, a core network is an evolved packet core (EPC). An LTE base station (for example, an eNB) serves as a master base station, and an NR base station (for example, a gNB) serves as a secondary base station to perform dual connectivity (DC), and both the master base station and the secondary base station are connected to the EPC. The master base station may also be referred to as a master node (MN), and the secondary base station may also be referred to as a secondary node (SN). Specifically, there is an X2 interface between the LTE base station and the NR base station at least for a control plane connection and optionally for a user plane connection; there is an S1 interface between the LTE base station and the EPC at least for a control plane connection and optionally for a user plane connection; and there is an S1-U interface between the NR base station and the EPC that may be for only a user plane connection. The LTE base station may provide an air interface resource for UE by using at least one LTE cell. In this case, the at least one LTE cell is referred to as a master cell group (MCG). Correspondingly, the NR base station may also provide an air interface resource for the UE by using at least one NR cell. In this case, the at least one NR cell is referred to as a secondary cell group (SCG).

Figure 2:
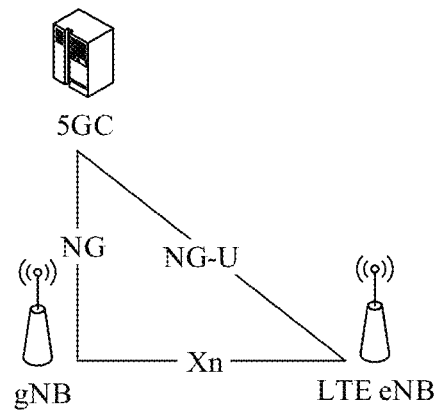
FIG. 2 is a schematic diagram of an NE-DC deployment scenario.

FIG. 2 is a schematic diagram of an NE-DC deployment scenario. NE-DC (NR E-UTRA DC) is one of MR-DC architectures in the 5GC. In the NE-DC scenario, a core network is the 5GC. An NR base station (for example, a gNB) serves as a master base station, and an LTE base station (for example, an ng-eNB) serves as a secondary base station to perform DC, and both the master base station and the secondary base station are connected to the 5GC. Specifically, there is an Xn interface between the LTE base station and the NR base station at least for a control plane connection and optionally for a user plane connection; there is an NG interface between the LTE base station and the 5GC at least for a control plane connection and optionally for a user plane connection; and there is an NG-U interface between the NR base station and the 5GC that may be for only a user plane connection. The LTE base station may provide an air interface resource for UE by using at least one LTE cell. In this case, the at least one LTE cell is referred to as an MCG. Correspondingly, the NR base station may also provide an air interface resource for the UE by using at least one NR cell. In this case, the at least one NR cell is referred to as an SCG.

Figure 3:
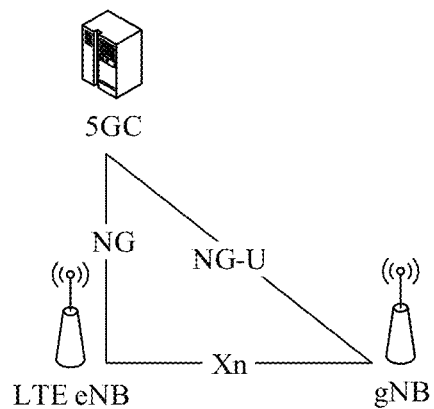
FIG. 3 is a schematic diagram of an NG EN-DC deployment scenario.

FIG. 3 is a schematic diagram of an NG EN-DC deployment scenario. NG EN-DC (next generation E-UTRA NR DC) is another type of MR-DC architecture in the 5GC. In the NG EN-DC scenario, a core network is the 5GC. An LTE base station (for example, an ng-eNB) serves as a master base station, and an NR base station (for example, a gNB) serves as a secondary base station to perform DC. Different from that in an EN-DC system, both the master base station and the secondary base station are connected to the 5GC. Specifically, there is an Xn interface between the NR base station and the LTE base station at least for a control plane connection and optionally for a user plane connection; there is an NG interface between the NR base station and the 5GC at least for a control plane connection and optionally for a user plane connection; and there is an NG-U interface between the NR base station and the 5GC that may be for only a user plane connection. The NR base station may provide an air interface resource for UE by using at least one NR cell. In this case, the at least one NR cell is referred to as an MCG. Correspondingly, the LTE base station may also provide an air interface resource for the UE by using at least one LTE cell. In this case, the at least one LTE cell is referred to as an SCG.

In addition, in the NR-DC (or referred to as NR-NR DC) deployment scenario, both the master base station and the secondary base station are NR base stations (for example, gNBs), and both are connected to the 5GC. Specifically, there is a control plane connection and optionally a data plane connection between the NR base station serving as the master base station and the 5GC, and there may be a data plane connection between the NR base station serving as the secondary base station and the 5GC. Both the master base station and the secondary base station may provide air interface transmission resources for data transmission between a terminal device and the 5GC.

In addition, LTE/5GC DC may be further supported. To be specific, both the master base station and the secondary base station are LTE base stations (for example, ng-eNBs), and both are connected to the 5GC. Specifically, there is a control plane connection and optionally a data plane connection between the LTE base station serving as the master base station and the 5GC, and there may be a data plane connection between the LTE base station serving as the secondary base station and the 5GC. Both the master base station and the secondary base station may provide air interface transmission resources for data transmission between the terminal device and the 5GC.

A specific DC architecture is not limited in this application. This application is applicable to not only conventional LTE EN-DC but also MR-DC and other future DC architectures. Hereinafter, NE-DC, NG EN-DC, and NR-DC are collectively referred to as MR-DC.

Figure 4:
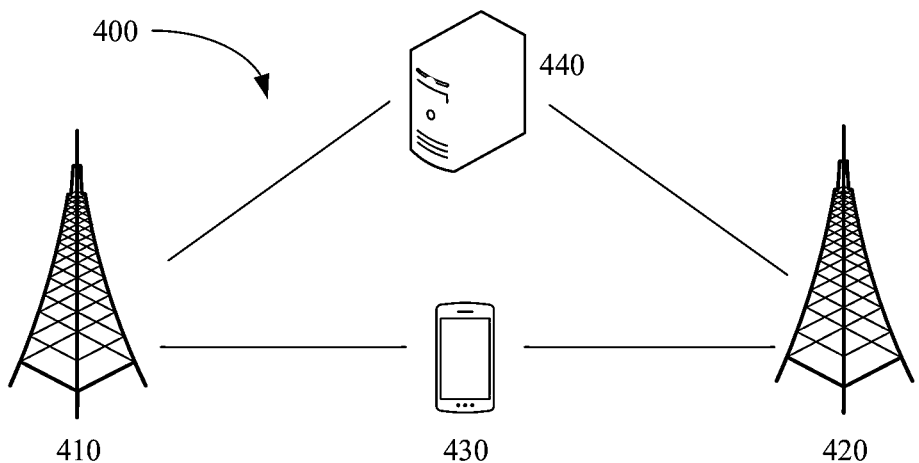
FIG. 4 is a schematic diagram of a communication system to which a communication method according to an embodiment of this application is applicable.

FIG. 4 is a schematic diagram of a communication system to which a communication method and a communication apparatus according to embodiments of this application are applicable. As shown in FIG. 4, the communication system 400 may include at least one network device, for example, a network device 410 and a network device 420 shown in FIG. 4. The communication system 400 may further include at least one terminal device, for example, a terminal device 430 shown in FIG. 4. The terminal device 430 may be mobile or fixed. Both the network device 410 and the network device 420 are devices such as base stations or base station controllers that can communicate with the terminal device 430 over a radio link. Each network device can provide communication coverage for a particular geographic area, and can communicate with a terminal device within the coverage (a cell). The wireless communication system 400 may further include at least one core network, for example, a core network 440 shown in FIG. 4. The core network 440 may be a 4G core network, a 5G core network, or the like.

A dual connectivity architecture in the deployment scenario described above may be formed between the core network 440 and the terminal device 430. For example, the network device 410 is an LTE base station serving as a master base station, the network device 420 is an NR base station serving as a secondary base station, the core network 440 is a 4G core network EPC, there are a control plane connection and a data plane connection between the network device 410 and the core network 440, and there is a data plane connection between the network device 420 and the core network 440. Both the network device 410 and the network device 420 provide air interface transmission resources for data transmission between the terminal device 430 and the core network 440. Therefore, the dual connectivity deployment scenario shown in FIG. 1 is constituted. In this case, the network device 410 corresponds to the LTE eNB shown in FIG. 1, the network device 420 corresponds to the gNB shown in FIG. 1, and the core network corresponds to the EPC shown in FIG. 1. Similarly, the communication system shown in FIG. 4 may further constitute a dual connectivity architecture in another deployment scenario described above.

FIG. 4 shows two network devices and one terminal device that are used as an example. However, this should not constitute any limitation on this application. Optionally, the communication system 400 may include more network devices, and another quantity of terminal devices may be included within coverage of each network device. Optionally, the communication system 400 may further include a plurality of core network devices. This is not limited in embodiments of this application.

A plurality of antennas may be configured for each communication device such as the network device 410, the network device 420, or the terminal device 430 in FIG. 4. The plurality of antennas may include at least one transmit antenna configured to send a signal and at least one receive antenna configured to receive a signal. In addition, each communication device additionally includes a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

Optionally, the wireless communication system 400 may further include another network entity, for example, a network controller or a mobility management entity. This is not limited in embodiments of this application.

The mobility scenario includes a handover scenario and/or an SN mobility scenario under multiple connectivity MC. The handover scenario may include, for example, at least one of a scenario of handover from a serving cell/base station to a target serving cell/base station in a single connectivity scenario and a scenario of handover from a master serving cell/master base station to a target master serving cell/master base station in a multiple connectivity scenario.

The SN mobility scenario may include at least one of SN addition or SN change (change) triggered by a master base station (MN) and SN change triggered by a secondary base station (SN) in a multiple connectivity scenario. The concept of SN exists in the foregoing DC or MC scenario.

To facilitate understanding of embodiments of this application, an SN mobility process triggered by a master base station or a secondary base station is first described with reference to FIG. 5 to FIG. 7.

Figure 5:
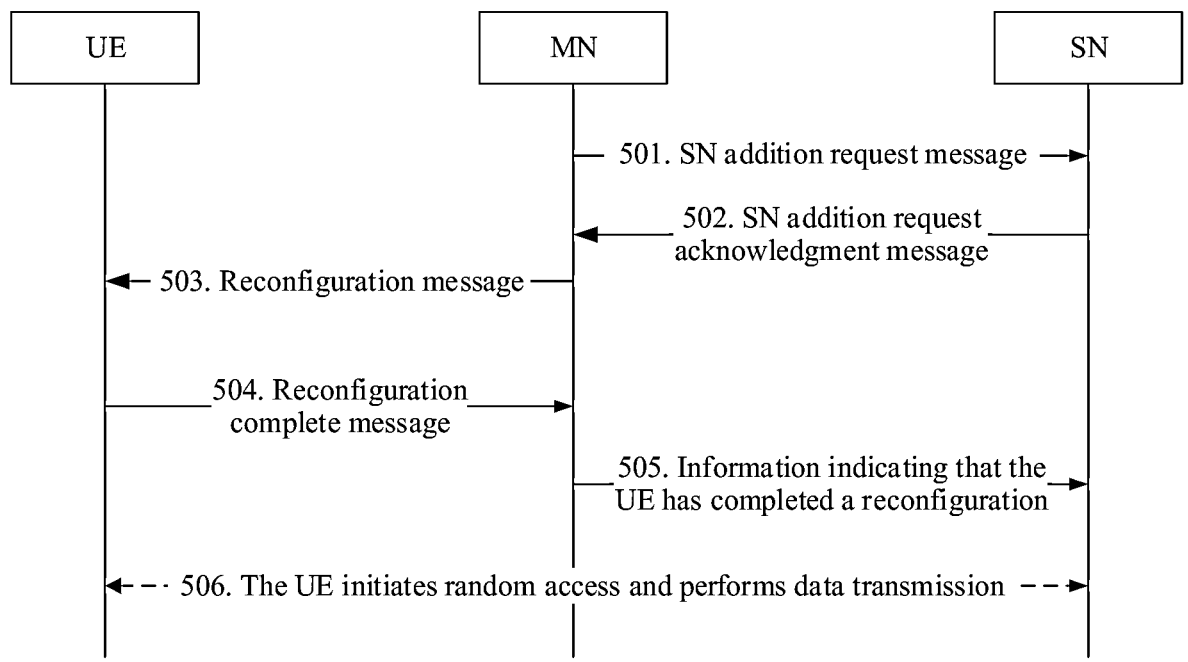
FIG. 5 is a schematic flowchart of an SN addition process triggered by a master base station.

FIG. 5 is a schematic flowchart of an SN addition process triggered by a master base station. As shown in FIG. 5, SN addition may include step 501 to step 506.

501. An MN sends an SN addition request message to an SN, to request the SN to allocate a resource to a bearer of UE.

For example, in EN-DC, the bearer may be an evolved radio access bearer (E-RAB); and in a DC architecture in which a 5GC is connected, the bearer may be a protocol data unit (PDU) session or a quality of service flow (QoS flow).

502. The SN sends an SN addition request acknowledgment message to the MN.

The SN provides configuration information for the UE. For a bearer to which an SCG air interface resource needs to be allocated, the SN provides an SCG RLC bearer configuration and an SCG cell configuration. The SN sends the foregoing configuration information provided for the UE to the MN.

503. The MN sends a reconfiguration message to the UE, where the message includes a configuration provided by the SN for the UE.

504. The UE sends a reconfiguration complete message to the MN.

To be specific, the UE successfully applies the configuration in the reconfiguration message, and the UE sends the reconfiguration complete message to the MN.

505. The MN notifies the SN that the UE completes a reconfiguration.

506. The UE initiates random access to the SN, to subsequently start data transmission.

It should be noted that there is no strict sequence of step 504 and step 506 (but step 505 is performed after step 504).

In the SN addition process shown in FIG. 5, the master base station sends an addition request to the secondary base station. After the secondary base station responds to the addition request, the master base station reconfigures the terminal device, so that data can be transmitted between the terminal device and the secondary base station.

Figure 6:
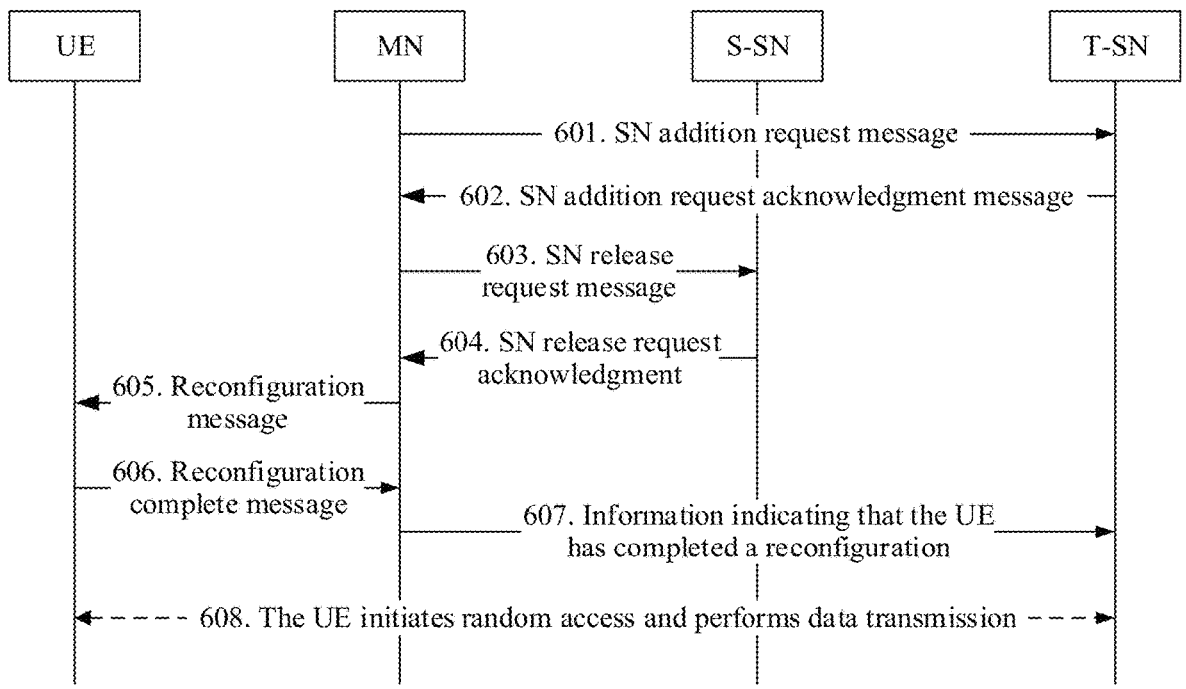
FIG. 6 is a schematic flowchart of an SN change process triggered by a master base station.

FIG. 6 is a schematic flowchart of an SN change process triggered by a master base station. As shown in FIG. 6, an SN change may include step 601 to step 608.

601. An MN sends an SN addition request message to a target SN (target SN or T-SN), to request the SN to allocate a resource to a bearer of UE.

602. The T-SN sends an SN addition request acknowledgment message to the MN.

The T-SN provides configuration information for the UE, and the SN sends, to the MN, the configuration information provided for the UE.

603. The master base station sends an SN release request message to a source SN (source SN or S-SN).

It should be understood that the source SN herein is a secondary base station connected to the UE before the source SN is changed to the target SN.

604. The source SN sends an SN release request acknowledgment message to the master base station.

605. The MN sends a reconfiguration message to the UE, where the message includes a configuration provided by the T-SN for the UE.

606. The UE sends a reconfiguration complete message to the MN.

To be specific, the UE successfully applies the configuration in the reconfiguration message, and the UE sends the reconfiguration complete message to the MN.

607. The MN notifies the T-SN that the UE completes a reconfiguration.

608. The UE initiates random access to the SN, to subsequently start data transmission.

Figure 7:
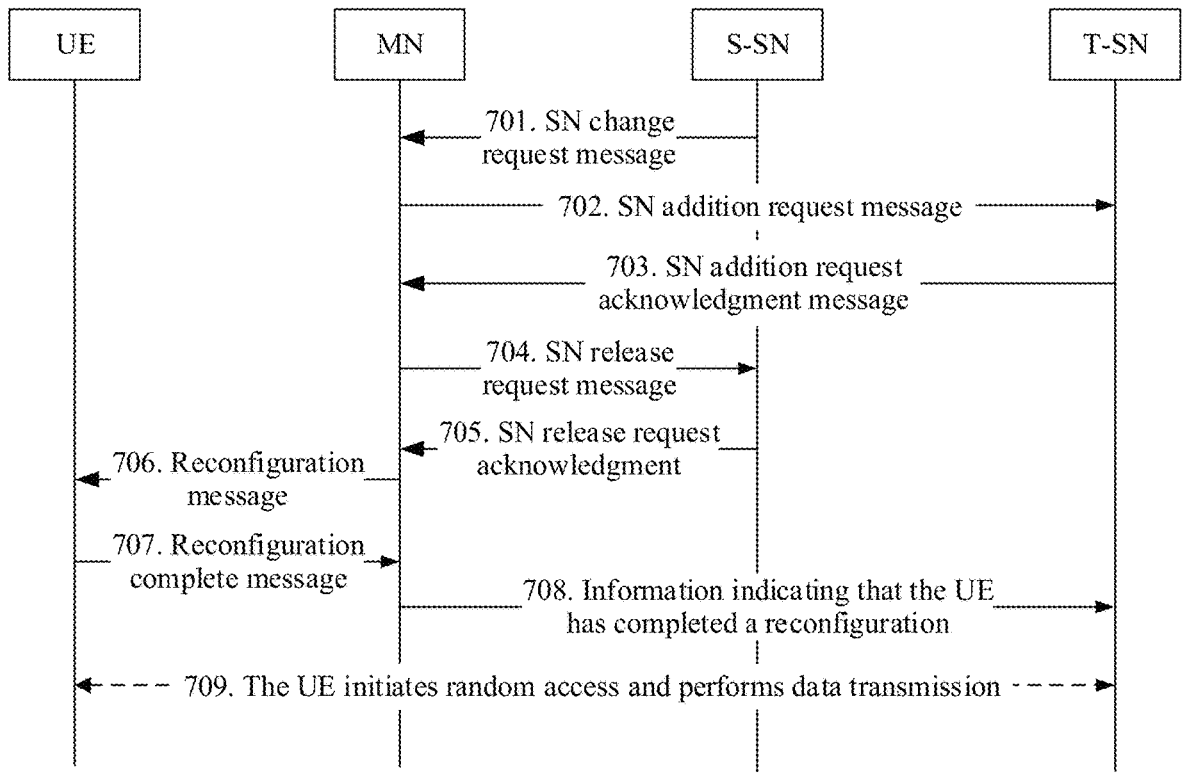
FIG. 7 is a schematic flowchart of an SN change process triggered by a secondary base station.

FIG. 7 is a schematic flowchart of an SN change process triggered by a secondary base station. As shown in FIG. 7, SN change includes step 701 to step 709.

701. An S-SN sends an SN change request message to an MN.

For descriptions of step 702 to step 709, refer to descriptions of step 601 to step 608 respectively. Details are not described herein again. In other words, after the S-SN sends the SN change request message to the MN, for a subsequent procedure, refer to S601 to S608, to complete the SN change.

The foregoing describes an procedure of successful SN addition or change. However, in practice, there may be an SN mobility failure scenario, for example, an SN cannot be added or an SN fails to be changed. An SN-related mobility scenario is involved in an MC scenario. However, currently, there is no technology for identifying a potential SN addition or change failure in the SN mobility scenario.

In view of this, this application proposes a communication method, to identify a potential failure in an SN mobility process, and improve robustness of SN mobility.

It may be understood that embodiments of this application are described by using an SN mobility scenario as an example, and may also be applicable to a handover scenario. That is, embodiments of this application are applicable to both a scenario of handover from a serving base station to a target serving base station or from a serving cell to a target serving cell in a single connectivity scenario and a scenario of handover from a master serving cell/master base station to a target master serving cell/master base station in a multiple connectivity scenario. It may be understood that, when applied to a handover scenario, related descriptions of a source secondary network device and/or a target secondary network device in embodiments of this application are applicable to the source (MN) network device and/or the target (MN) network device or are applicable to the source (MN) network device and/or the target (MN) network device after transformation.

It may be understood that in embodiments of this application, the terminal device and/or the network device may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be necessarily to be performed.

It may be understood that names of various objects such as various messages/information/devices/network elements/systems/apparatuses/actions/operations/procedures/concepts may appear in embodiments of this application. However, these specific names do not constitute a limitation on related objects, are only for ease of differentiation, and shall not constitute any limitation on this application. This application does not exclude a case in which other possible names that have a same or similar feature are defined in a future protocol to replace the existing names. The following describes in detail the method provided in embodiments of this application with reference to the accompanying drawings.

Figure 8:
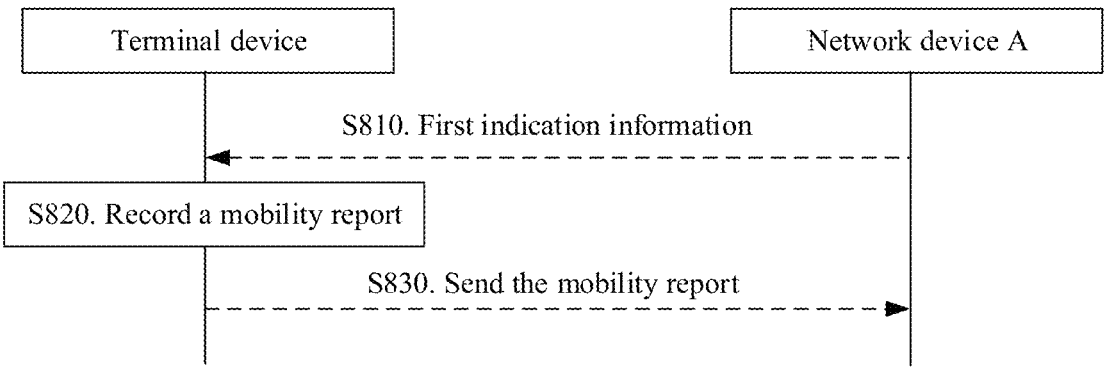
FIG. 8 is a schematic flowchart of a communication method according to an embodiment of this application.

FIG. 8 is a schematic flowchart of a communication method according to an embodiment of this application.

S820. UE (an example of a terminal device) records a mobility report.

The mobility report includes information related to secondary base station SN mobility of the UE (where an SN is an example of a secondary network device). The secondary network device mobility includes configuring the terminal device to add a target secondary network device and/or configuring the terminal device to change a secondary network device from a source secondary network device to a target secondary network device. It may be understood that the information related to the SN mobility includes one or more pieces of information that are related to a master base station, a secondary base station, a cell, time, the UE, or another parameter and that are recorded by the terminal device in an SN mobility scenario.

In all embodiments of this application, an example in which the mobility report is a successful secondary base station mobility report (successful SN mobility report) is used for description. It may be understood that the successful SN mobility report is merely used as an example of the mobility report, and is not intended to limit a type of the mobility report.

Optionally, the UE may record the successful SN mobility report by default in a protocol predefined manner.

Optionally, before S820, the communication method may further include S810.

S810. A network device A sends first indication information to the UE.

Correspondingly, the UE receives the first indication information sent by the network device A. The first indication information indicates to the terminal device to record the mobility report.

It may be understood that the network device A in S810 may be a master network device (MN) of the UE, or may be the source secondary network device (source SN) of the UE.

To be specific, the SN mobility scenario may be triggered by the MN, and the MN may directly send the first indication information to the UE. Alternatively, the SN mobility scenario may be triggered by the source SN, and the source SN may directly send the first indication information to the UE; or the source SN may send the first indication information or a part of the first indication information to the MN, and the MN sends the first indication information or the part of the first indication information to the UE. Optionally, when the source SN sends a part of the first indication information to the MN, the other part of the first indication information may be determined by the MN.

Optionally, the first indication information indicates whether the UE is to record the mobility report.

Optionally, the first indication information indicates configuration information for the UE to record the mobility report. For example, the configuration information includes at least one of the following parameters: a quality difference threshold, a quality threshold, a random access power threshold, and a random access preamble transmission quantity threshold. The UE determines, based on the parameters included in the configuration information, whether a corresponding trigger condition is met, and records the mobility report. A specific trigger condition and how the UE determines that the trigger condition is met are not described herein, and are described in detail in the following embodiments.

It may be understood that, in a possible implementation, regardless of whether the SN mobility scenario is triggered by the MN or the source SN, the network device A may send the first indication information to the UE. In other words, the network device A determines the first indication information.

Optionally, when the network device A is the MN, and the SN mobility scenario is triggered by the source SN, before S810, the communication method may further include S800.

S800. The MN receives the first indication information or the part of the first indication information sent by the source SN.

Correspondingly, the source SN sends the first indication information or the part of the first indication information to the MN. In this case, the source SN may determine the first indication information or the part of the first indication information. For example, the parameters in the configuration information of the first indication information may be determined by the MN, or the source SN may send these parameters to the MN. Optionally, a parameter that is not sent by the source SN may be determined by the MN.

S830. The UE sends the mobility report to a network device B.

It can be learned from the foregoing that the SN mobility scenario may be triggered by the MN, or may be triggered by the source SN.

The network device B may be the same as or different from the network device A.

Optionally, before the UE sends the mobility report to the network device B, the method further includes: The UE sends second indication information to the network device B, where the second indication information indicates that the UE has stored the mobility report. When learning, based on the second indication information, that the UE has stored the mobility report, the network device B may send request information to the UE. In this case, the UE receives the request information sent by the network device B to the UE, where the request message is used to request the UE to report the mobility report. Optionally, the second indication information may also indicate a type of the mobility report stored in the UE. The type of the mobility report may be an intra-system mobility report, an inter-system mobility report, an intra-RAT mobility report, or an inter-RAT mobility report.

It should be understood that the related information in the mobility report includes information related to the master base station and/or the source secondary base station that triggers SN addition or change. However, because the UE cannot determine whether current SN mobility is triggered by the MN or the SN, the UE generally records only the information related to the MN, or records the information related to both the MN and the source SN. Optionally, the UE may record the information related to the MN or the information related to both the MN and the source SN in a protocol predefined manner. Alternatively, optionally, before S820, the communication method may further include: The UE receives third indication information sent by the network device A, where the third indication information indicates to the UE to record the information related to the MN and/or the source SN, indicates whether the UE needs to record the information related to the MN, or indicates whether the UE needs to record the information related to the source SN.

FIG. 8 shows only an example of sending the mobility report to the MN. When the SN mobility is triggered by the MN, the UE may directly send the report to the MN, or may send the report to another network device (an example of a first network device), and the other network device forwards the report to the MN. Correspondingly, the MN receives the mobility report, and the MN may configure (adjust or maintain) a corresponding mobility parameter based on the received mobility report during next time of SN addition or change. For example, when there is an SN mobility failure or a possible SN mobility failure, the MN may adjust a related parameter in an SN mobility process based on the received SN mobility report, to implement network optimization. For example, adjusting the related parameter may include at least one of the following: PRACH resource adjustment, coverage adjustment, handover parameter adjustment, and beam adjustment. When the SN mobility is triggered by the source SN, the UE may directly send the report to the source SN; or the UE may directly send the report to the MN, and the MN forwards the report to the source SN. Alternatively, the UE may send the report to another network device, and the other network device directly forwards the report to the SN, or the other network device forwards the report to the MN and then the MN forwards the report to the source SN. Correspondingly, the source SN receives the mobility report, and the source SN may configure (adjust or maintain) a corresponding mobility parameter based on the received mobility report during next time of SN addition or change. For example, when there is an SN mobility failure or a possible SN mobility failure, the source SN may adjust a related parameter in an SN mobility process based on the received SN mobility report, to implement network optimization. For example, adjusting the related parameter may include at least one of the following: PRACH resource adjustment, coverage adjustment, handover parameter adjustment, and beam adjustment. For specific transmission of the successful SN mobility report between network devices by using signaling through different interfaces, refer to descriptions in FIG. 9 and FIG. 10. Details are not described herein.

Figure 9:
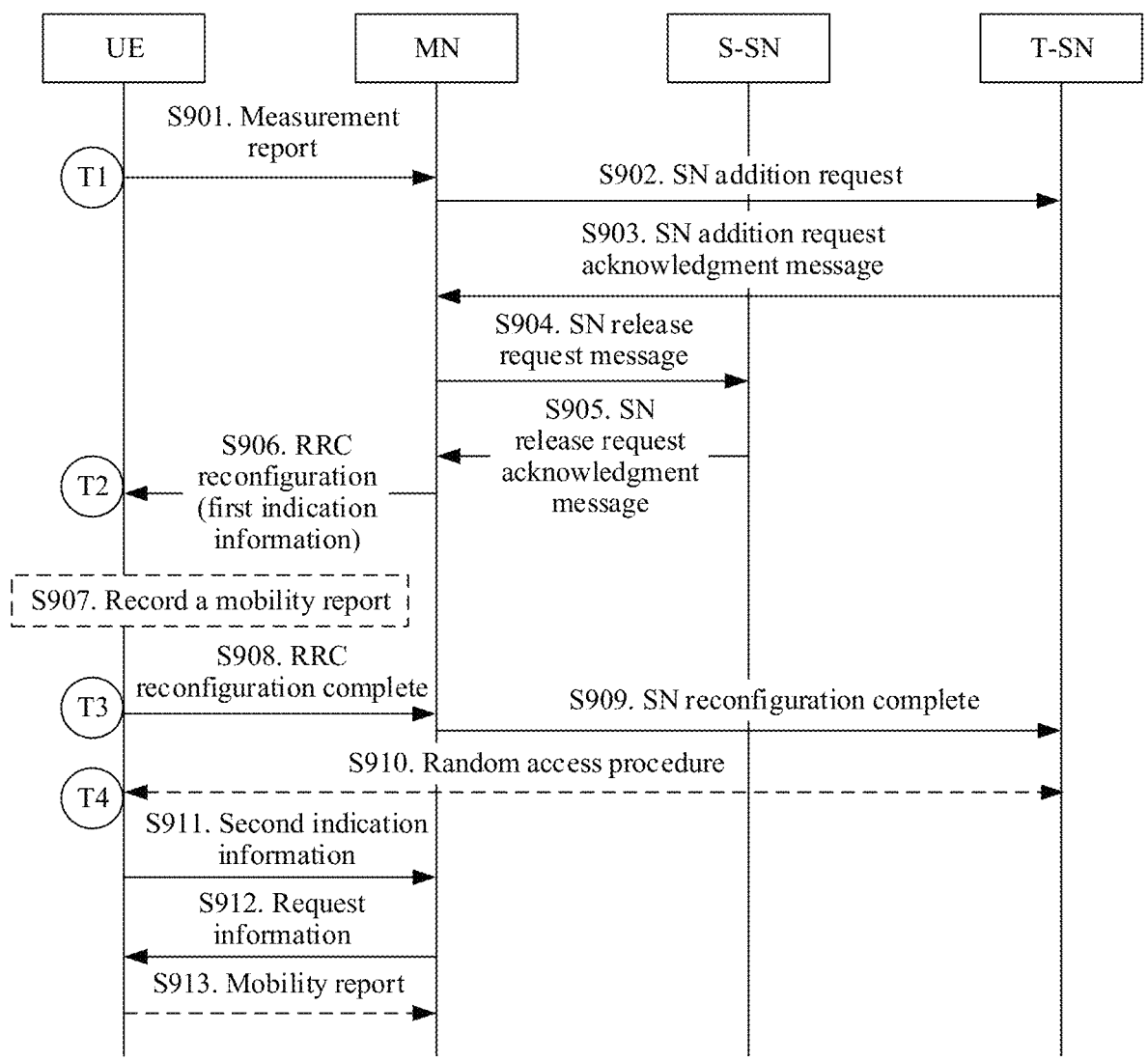
FIG. 9 is a schematic flowchart of a communication method according to an embodiment of this application.

FIG. 9 is a schematic flowchart of a communication method according to an embodiment of this application. In some embodiments, an MN triggers SN change, that is, the MN triggers a terminal device to change a secondary node from a source SN to a target SN.

S901. UE (an example of a terminal device) reports a measurement report to an MN (an example of a master network device).

Correspondingly, the MN receives the measurement report of the UE, and the MN determines, based on the measurement report of the UE, that an SN (an example of a secondary network device) needs to be changed.

Optionally, the measurement report includes quality of a cell of a target SN (an example of a target secondary network device).

S902. The MN sends an SN addition request message to the T-SN, to request the SN to allocate a resource to the UE.

S903. The T-SN sends an SN addition request acknowledgment message to the MN.

The SN addition request acknowledgment message carries configuration information provided by the T-SN for the UE.

S904. The MN sends an SN release request message to an S-SN.

S905. The S-SN sends an SN release request acknowledgment message to the MN.

In a possible implementation, the MN releases a connection to the source SN. This procedure does not actually release the source SN, but mainly triggers the S-SN to no longer send data to the UE.

It may be understood that the foregoing steps S901 to S905 are merely used as an example of a part of a procedure of SN change triggered by the MN. This embodiment is also applicable to an SN addition scenario triggered by the MN. It may be understood that in this scenario, the terminal device and/or a network device may perform some or all of the steps in embodiments of this application. These steps or operations are merely examples. In some embodiments of this application, other operations or variations of various operations may be further performed.

Optionally, in S906, the MN sends first indication information to the UE.

The MN may send SN mobility configuration information to the UE in an RRC reconfiguration message (that is, a mobility configuration). The SN mobility configuration information may include the configuration information of the target SN.

Optionally, the RRC reconfiguration message may include the first indication information, and the first indication information indicates whether the UE is to record a mobility report.

Optionally, the first indication information indicates to trigger the UE to record configuration information of the mobility report. For example, the configuration information may include at least one of the following parameters: a quality difference threshold, a quality threshold, a random access power threshold, and a random access preamble transmission quantity threshold. When the UE determines, based on the configuration information, that a trigger condition for recording the mobility report is met, the UE records the mobility report. The trigger condition for recording the mobility report by the UE is specifically described in the following steps. Details are not described herein.

Optionally, in a possible implementation, the MN receives the first indication information or a part of the first indication information sent by the target SN. For example, the MN may receive the random access power threshold and/or the random access preamble transmission quantity threshold that are/is sent by the target SN. In an example, the parameters in the configuration information may be determined by the MN, or may be sent by the target SN to the MN. Optionally, when the target SN sends a part of the first indication information to the MN, the other part of the first indication information may be determined by the MN.

The mobility report may be a successful secondary base station mobility report (successful SN mobility report) or another report. In some embodiments of this application, an example in which the mobility report is a successful SN mobility report is used for description. By way of example rather than limitation, the successful SN mobility report is only used as a possible type of report of the mobility report.

S907. The UE records the mobility report.

Optionally, the UE may record the mobility report by default in a protocol predefined manner. It may be understood that, if the UE records the mobility report in the protocol predefined manner, in another possible implementation, step S907 may be implemented before step S901, or may be implemented after step S901 and before step S902. For example, if the mobility report needs to record SN-related cell quality information in the measurement report reported by the UE, the UE may implement step S907 before step S901.

Optionally, when the first indication information indicates whether the UE is to record the mobility report, the UE may determine, based on the received first indication information, whether to record the mobility report. For example, if the first indication information indicates to the UE to record the mobility report, the UE records the mobility report; or if the first indication information indicates to the UE not to record the mobility report, the UE does not record the mobility report. Optionally, when the first indication information is the configuration information for recording the mobility report by the UE, the UE may determine, based on the configuration information in the first indication information, whether a corresponding trigger condition is met, and record the mobility report when the trigger condition is met.

By way of example rather than limitation, the foregoing trigger condition may be one or more of the following conditions (a) to (d):

(a) The UE records the mobility report when an absolute value of a quality difference between the cell qualities, corresponding to a first moment and a second moment, of a cell of the target SN is greater than or equal to a first quality difference threshold; and/or the UE records the mobility report when an absolute value of a quality difference between the cell qualities, corresponding to the first moment and the second moment, of a cell of the source SN is greater than or equal to a second quality difference threshold. It may be understood that the quality difference threshold in the configuration information may be used to determine the first quality difference threshold and/or the second quality difference threshold, where the first quality difference threshold and the second quality difference threshold may be the same or may be different. Alternatively, the quality difference threshold in the configuration information may include the first quality difference threshold and/or the second quality difference threshold. The cell quality may include at least one of received signal code power (RSCP), reference signal received power (RSRP), reference signal received quality (RSRQ), a signal-to-noise ratio (SNR), a signal to interference plus noise ratio (SINR), a reference signal strength indication (r RSSI), or other signal quality. The cell quality may be of at least one of a cell level, a beam level, a synchronization signal/physical broadcast channel block level, a channel state information reference signal (CSI-RS) level, a numerology level, a slice (slicing) level, or a bandwidth part (BWP) level. The cell quality may be obtained by measuring at least one of a downlink synchronization channel, a channel state information reference signal, a demodulation reference signal (DMRS), a cell-specific reference signal (CRS) signal, a synchronization signal (SS), a synchronization signal/physical broadcast channel block (SS/PBCH Block), or other downlink signals. It may be understood that if the cell quality information is of the beam level, the synchronization signal/physical broadcast channel block level, the numerology level, the slice level, or the bandwidth part level, the cell information may further include at least one of identification information of a corresponding beam, synchronization signal/physical broadcast channel block, channel state information reference signal, numerology, slice, or bandwidth part. In correspondence to the cell quality, the quality difference threshold or the quality threshold may include at least one of an RSCP threshold, an RSRP threshold, an RSRQ threshold, an SNR threshold, an SINR threshold, an RSSI threshold, or other quality thresholds.

The first moment and the second moment in the trigger condition (a) include any two of the following moments:
① a moment at which the terminal device reports the cell quality of a cell of the target secondary network device (that is, time T1 marked by a circle in FIG. 9);
② a moment at which the terminal device receives a secondary network device mobility configuration (that is, time T2 marked by a circle in FIG. 9);
③ a moment at which the terminal device sends a secondary network device mobility configuration complete message (that is, time T3 marked by a circle in FIG. 9); and
④ a moment at which the terminal device completes random access to the target secondary network device (that is, time T4 marked by a circle in FIG. 9).

For example, the first moment may be T1, and the second moment may be T3; or the first moment may be T4, and the second moment may be T1. Alternatively, the first moment in the foregoing example may be the second moment, and the second moment in the foregoing example may be the first moment. That is, the first moment may be T3, and the second moment may be T1; or the first moment may be T1, and the second moment may be T4.

Optionally, for example, the first moment is a prior moment (for example, T1), the cell quality, corresponding to the first moment, of the cell of the target SN is Q1, the second moment is a later moment (for example, T3), and the cell quality, corresponding to the second moment, of the cell of the target SN is Q2, and a quality difference threshold is 3, Q1=2, Q2=7, and an absolute value of a difference between Q1 and Q2 is 5. In this case, although the absolute value of a difference between the cell quality at the two moments is greater than the quality difference threshold 3, the cell quality at the second moment is better than that at the first moment, and the terminal device may choose not to record the mobility report.

(b) The UE records the mobility report when cell quality of the cell of the target SN at a third moment is less than or equal to a first quality threshold; and/or the UE records the mobility report when the cell quality of the cell of the source SN at the third moment is less than or equal to a second quality threshold. It may be understood that the quality threshold in the configuration information may be used to determine the first quality threshold and/or the second quality threshold, where the first quality threshold and the second quality threshold may be the same or may be different.

The third moment in the trigger condition (b) includes any one of the following moments:

① the moment at which the terminal device receives the secondary network device mobility configuration (that is, time T2 marked by a circle in FIG. 9);
② the moment at which the terminal device sends the secondary network device mobility configuration complete message (that is, time T3 marked by a circle in FIG. 9); and
③ the moment at which the terminal device completes random access to the target secondary network device (that is, time T4 marked by a circle in FIG. 9).

(c) In the random access procedure between the UE and the target SN (that is, the moment T4 marked by a circle in FIG. 9), the UE records the mobility report when uplink power at which the UE performs the last random access to the target SN is greater than or equal to the random access power threshold, uplink power at which the UE initiates the last random access to the target SN reaches maximum uplink transmit power of the UE, or a difference between uplink power at which the UE initiates the last random access to the target SN and maximum uplink transmit power of the UE is less than the random access power threshold.

It may be understood that, in some embodiments of this application, that the UE performs random access may mean that the UE sends a preamble, for example, a message (for example, msg1) in a four-step random access procedure, or a message (for example, msgA and/or msg1) in a scenario in which a two-step random access procedure is rolled back to a four-step random access procedure. Alternatively, that the UE performs random access may mean that the UE sends a preamble and uplink data, for example, a message (for example, msgA) in a two-step random access procedure.

(d) In the random access procedure between the UE and the target SN (that is, moment T4 marked by a circle in FIG. 9), the UE records the mobility report when a quantity of times that the UE sends a random access preamble is greater than or equal to the random access preamble transmission quantity threshold.

Optionally, the random access preamble transmission quantity threshold may be indicated by the configuration information in the first indication information, or may be a maximum preamble transmission quantity indicated in a system message.

Optionally, the random access preamble transmission quantity threshold may be any one of a threshold for a quantity of times of transmitting a two-step random access preamble (for example, a threshold for a quantity of times of transmitting msgA), a threshold for a quantity of transmitting a four-step random access preamble (for example, a threshold for a quantity of times of transmitting msg1), and a threshold for a total quantity of times of transmitting two-step and four-step random access preambles (for example, a threshold for a total quantity of times of transmitting msgA and msg1). Correspondingly, the UE determines whether to record the mobility report, based on a result of comparison between a quantity of times of sending the two-step random access preamble and the threshold for the quantity of times of transmitting the two-step random access preamble, between a quantity of times of sending the four-step random access preamble and the threshold for the quantity of times of transmitting the four-step random access preamble, or between a total quantity of times of sending the two-step and four-step random access preambles and the threshold for the total quantity of times of transmitting the two-step and four-step random access preambles.

It should be understood that, if there are a plurality of trigger conditions described above, for example, there are trigger conditions (a), (c), and (d), the mobility report may be recorded when (a), (c), and (d) are all met, or the mobility report may be recorded when any one of (a), (c), and (d) is met. This is not specifically limited in this application.

S908. The UE sends an RRC reconfiguration complete message to the MN.

It should be understood that the reconfiguration complete message may indicate that the UE successfully applies the configuration in the RRC reconfiguration message in S906.

S909. The MN sends SN reconfiguration complete information to the target SN, to notify the SN that the UE completes a reconfiguration.

S910. The UE performs the random access procedure with the target SN, to synchronize with the target SN, to subsequently start data transmission.

S911. The UE sends second indication information to the MN, where the second indication information indicates that the UE has stored the mobility report.

It may be understood that an example in which the UE sends the mobility report to the MN is used for description in some embodiments of this application. This is merely an example, and imposes no limitation.

For specific descriptions of the second indication information, refer to step S830 in the embodiment corresponding to FIG. 8. Details are not described herein again.

S912. The MN sends request information to the UE, to request the UE to report the mobility report.

S913. The UE sends the mobility report to the MN.

Correspondingly, the MN receives the mobility report sent by the UE. The SN mobility in some embodiments is triggered by the MN. The MN may configure (adjust or maintain) a corresponding mobility parameter based on the received mobility report during next time of SN addition or change. For example, when there is an SN mobility failure or a possible SN mobility failure, the MN may adjust a related parameter in an SN mobility process based on the received SN mobility report, to implement network optimization. For example, adjusting the related parameter in the SN mobility process may include at least one of the following: PRACH resource adjustment, coverage adjustment, handover parameter adjustment, and beam adjustment.

By way of example rather than limitation, content of the mobility report in some embodiments of this application may include one or more of the following information:

(1) Cell quality, corresponding to the moments T1, T2, T3, and T4 respectively, of a cell of a source MN, the cell of the source SN, and the cell of the target SN: A beam identifier corresponding to each cell or a beam identifier and beam quality that correspond to each cell may be further included.

(2) Cell information of the cell of the source MN: The cell information may include at least one of the following: a cell global identifier (CGI), a tracking area code (TAC), a physical cell identifier (PCI), frequency information, a cell identifier (CELL ID), a non-public network identifier (NPN ID), a non-terrestrial network identifier (NTN ID), or other cell identifiers. Optionally, the cell information may be cell information corresponding to a cell accessed by the terminal device, or may be information about a first cell in information about at least one cell sent by a cell accessed by the terminal device. For example, the cell accessed by the terminal device sends public land mobile network (PLMN) 1+CELL ID 1+TAC 1 and PLMN 2+CELL ID 2+TAC 2, the cell accessed by the terminal device is PLMN 2+CELL ID 2+TAC 2, and cell information recorded by the terminal device may be PLMN ID 1+CELL ID 1+TAC 1 and/or PLMN ID 2+CELL ID 2+TAC 2.

(3) Cell information of the cell of the source SN and the cell of the target SN (4) Mobility parameter: This is a mobility parameter configured by a network device and related to SN mobility triggering. It may be understood that the network device may be the MN, may be the source SN, or may be the MN and the source SN.

(5) Random access information of the UE in the cell of the target SN: For example, the random access information includes one or more of the following information: a quantity of preamble initiation times, a quantity of power ramping times, information indicating whether maximum transmit power of the UE is reached when random access is initiated for the last time, random access configuration information of the cell of the target SN that is received by the UE, an absolute frequency point (for example, absoluteFrequencyPoint) of a reference resource block, a frequency domain location and a bandwidth (for example, locationAndBandwidth) of a BWP corresponding to a resource used by the UE to perform random access, a subcarrier spacing (for example, subcarrierSpacing) of the BWP corresponding to the resource used by the UE to perform random access, a frequency resource start location (for example, msg1-FrequencyStart) of a physical random access channel (PRACH) resource, a subcarrier spacing (for example, msg1-SubcarrierSpacing) of the PRACH resource, and a quantity (for example, msg1-FDM) of PRACH transmission occasions (transmission occasion) for frequency division multiplex (FDM) at a same time. It may be understood that the random access information may be two-step random access information and/or four-step random access information.

(6) Time information: indicates time from a moment at which the UE receives the mobility configuration of the target SN (S906), the UE completes the mobility configuration of the target SN (S908), or the UE completes random access to the target SN (S910) to a moment at which the report is reported.

(7) UE identification information and/or UE verification information in the MN or the source SN: The UE identification information is used by MN or the source SN to identify the corresponding UE. The UE identification information may include a physical cell identifier (PCI) of the MN or the source SN and a cell radio network temporary identifier (C-RNTI) allocated by the MN or the source SN to the UE, or the UE identification information may be an identifier allocated by the MN or the source SN to the UE for identifying the UE on an interface between base stations. For example, the identifier allocated by the MN to the UE for identifying the UE on the interface between the base stations may be an M-NG-RAN node UE XnAP ID or an MeNB UE X2AP ID, and the identifier allocated by the source SN to the UE for identifying the UE on the interface between the base stations may be an S-NG-RAN node UE XnAP ID or an SeNB UE X2AP ID. The UE verification information is used by the MN or the source SN to verify whether the UE is UE previously served by the MN or the source SN. The UE verification information may be a short message authentication code-integrity (MAC-I).

It should be understood that functions of information in (2) is mainly as follows: After the UE reports the mobility report to another network device (an example of a first network device), the other network device can find the source MN based on (2). For example, the source MN may verify and identify the UE based on (7), and identify, based on at least one of (1) and (3) to (6), whether the mobility parameter related to the SN mobility needs to be adjusted.

Further, if the mobility parameter needs to be adjusted, proper adjustment is performed. One or more of (1), (5), and (8) may be further sent to the target SN. The target SN configures the mobility report. When there is a potential SN mobility failure, a corresponding parameter is adjusted based on a parameter in the configured mobility report.

It can be learned from the foregoing that the mobility report includes information related to the master base station and/or the source secondary base station. However, because the UE cannot determine, in the SN mobility process, whether current SN mobility is triggered by the MN or the SN, the UE generally records only the information related to the MN, or records the information related to both the MN and the source SN. Optionally, the UE may record only the information related to the MN or the information related to both the MN and the source SN in a protocol predefined manner. Alternatively, optionally, the MN may send third indication information to the UE. For example, the third indication information is carried in an RRC reconfiguration message. The third indication information indicates to the UE to record information related to the MN and/or the source SN, indicates whether the UE needs to record the information related to the MN, or indicates whether the UE needs to record the information related to the source SN.

The information related to the MN and/or the source SN may include at least one of the following: the cell information of the cell in the MN and/or the source SN, and the cell quality, corresponding to the moments T1, T2, T3, and T4, of the cells of source MN and the source SN (for the moments T1, T2, T3, and T4 herein, refer to descriptions of the first moment and the second moment in S907, and details are not described herein again). Optionally, the information related to the MN and/or the source SN may further include a beam identifier, or include a beam identifier and beam quality. In some embodiments, the SN mobility is triggered by the MN. In a possible implementation, the MN (which may also be referred to as the source MN) may indicate, based on the third indication information, that the UE may record only the information related to the MN.

It should be noted that, in S913, that the UE sends the mobility report to the source MN is only used as an example, and the UE may further send the mobility report to another network device different from the source MN. Optionally, the other network device may determine, based on the information related to the source MN in the mobility report, to forward a part or all of information in the mobility report to the source MN.

For example, if an interface that can be used for direct communication exists between the other network device and the source MN, the other network device sends a part or all of information in the mobility report to the source MN through the interface between the base stations (which may also be referred to as a direct sending mechanism). The interface between the other network device and the source MN may be an X2 interface or an Xn interface. Specifically, the other network device may send the part or all of information in the mobility report to the source MN in a failure indication message, a handover report message, or another message.

If the other network device cannot directly communicate with the source MN, the other network device may send a part or all of information in the mobility report to the source MN via a core network device (which may also be referred to as an indirect sending mechanism). For example, the part or all of information in the mobility report is sent to the core network device through an interface between a base station and the core network device. Specifically, the other network device sends the part or all of information in the mobility report to the core network device through an S1 or NG interface, and the core network device forwards, to the source MN, the information received from the other network device. Specifically, the other network device may send the part or all of information in the mobility report to the source MN in at least one of the following messages through the S1 or NG interface: an uplink RAN configuration transfer (uplink ran configuration transfer) message, a downlink RAN configuration transfer message, a base station configuration transfer (eNB configuration transfer) message, a core network device configuration transfer (mobility management entity configuration transfer) message, or other messages. Optionally, the other network device may further send type information of the mobility report to the source MN by using the foregoing direct or indirect sending mechanism. The type information indicates a coding format of the mobility report. For example, the coding format may be any one of eLTE, LTE, and NR. LTE means that the UE is connected to a 4G core network device by using an evolved UMTS terrestrial radio access network (evolved UMTS terrestrial radio access network, E-UTRAN) radio access technology, eLTE means that the UE is connected to a 5G core network device by using an E-UTRAN radio access technology, and NR means that the UE is connected to a 5G core network device by using an NR radio access technology.

Optionally, if the source MN receives the mobility report, the source MN may send a part of information in the mobility report to the target SN, for example, send the information related to the target SN. The information related to the target SN may include at least one of the following: random access information of the UE in the cell of the target SN, a CGI of the cell of the target SN, and the cell quality, corresponding to the moments T1, T2, T3, and T4 respectively, of the cell of the target SN. Optionally, the information related to the target SN may further include a beam identifier, or include a beam identifier and beam quality.

Optionally, if the source MN receives the mobility report, the source MN may send all or a part of information in the mobility report to the source SN. Correspondingly, the source SN receives the mobility report, and the source SN may configure (adjust or maintain) a corresponding mobility parameter based on the received mobility report during next time of SN addition or change. For example, when there is an SN mobility failure or a possible SN mobility failure, the source SN may adjust a related parameter in an SN mobility process based on the received SN mobility report, to implement network optimization. For example, adjusting the related parameter may include at least one of the following: PRACH resource adjustment, coverage adjustment, handover parameter adjustment, and beam adjustment. For a specific sending mechanism, refer to the foregoing descriptions of sending the part or all of information in the mobility report by the other network device to the source MN. Details are not described herein again. Optionally, the source MN may further send the type information of the mobility report to the source SN by using the foregoing direct or indirect sending mechanism.

If the source MN is in a CU-DU architecture, the method procedure in some embodiments may further include: A source MN CU sends the part or all of information in the mobility report to a source MN DU. Correspondingly, the DU receives the mobility report, and the DU may configure (adjust or maintain) a corresponding mobility parameter based on the received mobility report during next time of SN addition or change. For example, when there is an SN mobility failure or a possible SN mobility failure, the DU may adjust a related parameter in an SN mobility process based on the received SN mobility report, to implement network optimization. For example, adjusting the related parameter may include at least one of the following: PRACH resource adjustment, coverage adjustment, handover parameter adjustment, and beam adjustment.

Optionally, if the mobility report includes the random access information of the UE in the cell of the target SN, this embodiment further includes: The source MN sends the information related to the target SN to the target SN. The information related to the target SN may include at least one of the following: random access information of the UE in the cell of the target SN, a CGI of the cell of the target SN, and the cell quality, corresponding to the moments T1, T2, T3, and T4 respectively, of the cell of the target SN. Optionally, the information related to the target SN may further include a corresponding beam identifier or beam quality. For a specific sending mechanism, refer to the foregoing descriptions of sending the part or all of information in the mobility report and/or the type information of the mobility report by the other network device to the source MN. Details are not described herein again. Optionally, the source MN may further send type information of the information related to the target SN to the target SN by using the foregoing direct or indirect sending mechanism.

It should be understood that if the target SN is in a CU-DU architecture, a target SN-CU further needs to send a part or all of the information related to the target SN to a target SN-DU. Correspondingly, the DU receives the part or all of the information related to the target SN, and the DU may configure (adjust or maintain) a corresponding mobility parameter based on the received part or all of the information related to the target SN during next time of SN addition or change. For example, when there is an SN mobility failure or a possible SN mobility failure, the DU may adjust, based on the received SN mobility report, a related parameter of the target SN in an SN mobility process, to implement network optimization.

In the foregoing embodiment, a mobility report mechanism is introduced in an SN mobility process, and the MN configures the mobility report during next time of SN addition or change, so that the MN can identify a potential failure in the SN mobility process, and adjust a corresponding parameter based on the configured mobility report, thereby improving robustness of SN mobility.

Further, a trigger mechanism for recording the mobility report by the UE is introduced, to reduce energy consumption of the UE caused by recording a mobility report in any scenario by the UE and signaling overheads for subsequently transmitting the report.

Figure 10:
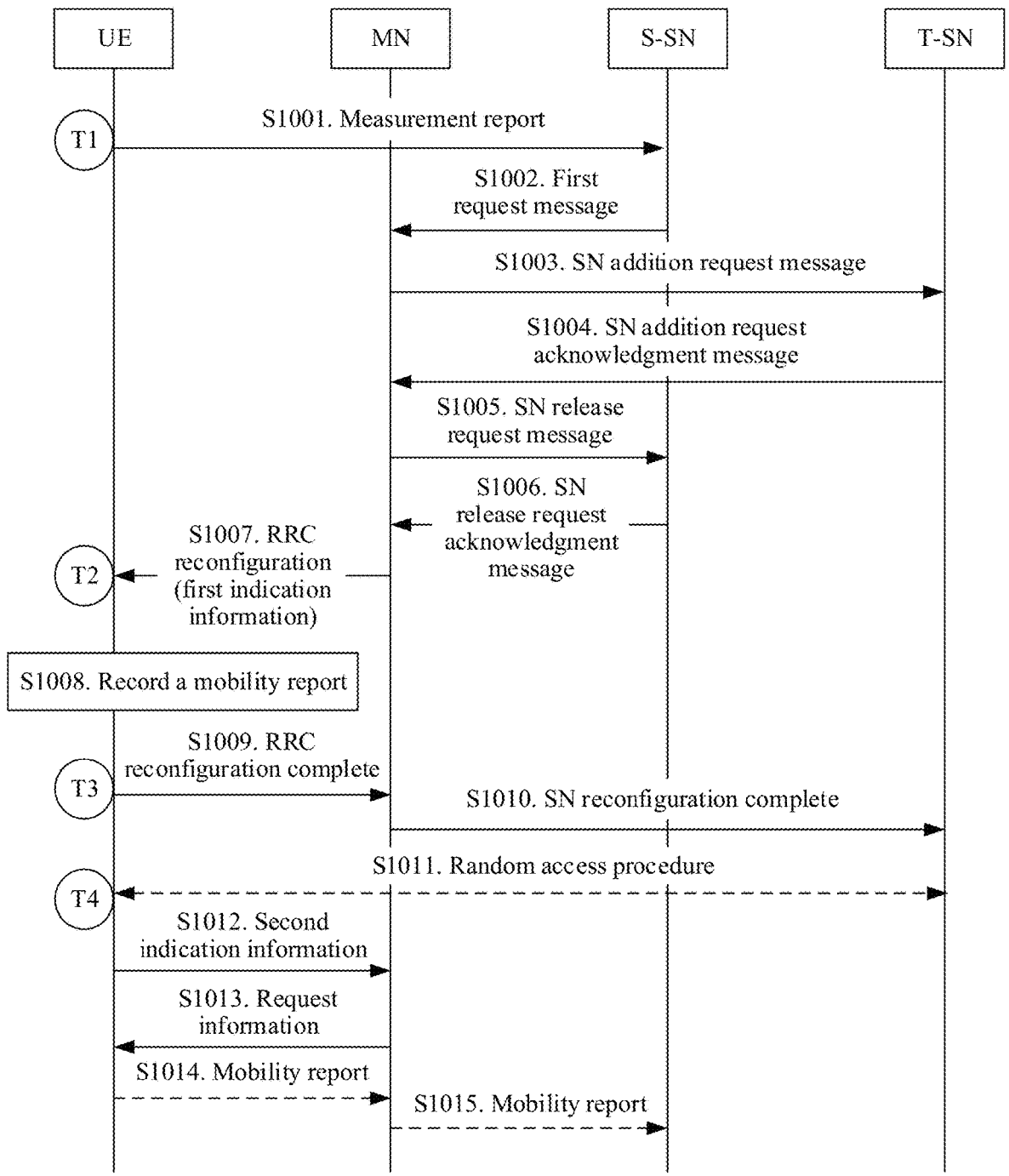
FIG. 10 is a schematic flowchart of a communication method according to an embodiment of this application.

FIG. 10 is a schematic flowchart of a communication method according to an embodiment of this application. In some embodiments, a source SN triggers SN change, that is, the source SN triggers a terminal device to change a secondary node from the source SN to a target SN.

S1001. UE (an example of a terminal device) reports a measurement report to an S-SN.

Correspondingly, the source SN receives the measurement report of the UE, and the source SN determines, based on the measurement report of the UE, that an SN needs to be changed.

Optionally, the measurement report includes quality of a cell of a target SN (an example of a target secondary network device).

S1002. The S-SN sends a first request message to an MN, where the first request message includes a request for requesting the MN to configure the SN to be changed to the target SN.

Optionally, the first request message may include a mobility parameter for the source SN to determine current SN change, and the message may help the source SN determine a problematic mobility parameter. The MN may store the information. When receiving a mobility report, the MN may send the mobility parameter and all or a part of information in the mobility report to the source SN, so that the source SN determines a mobility parameter that needs to be adjusted. Alternatively, the MN may send the mobility parameter to the UE, so that the UE records the mobility parameter in the mobility report.

Optionally, the first request message includes first indication information indicating whether the MN performs configuration. For the first indication information, refer to the descriptions of the first indication information in S906 in the embodiment corresponding to FIG. 9. Details are not described herein again.

S1003. The MN sends an SN addition request message to the T-SN, to request the SN to allocate a resource to the UE.

S1004. The T-SN sends an SN addition request acknowledgment message to the MN. The SN addition request acknowledgment message carries configuration information provided by the target SN for the UE.

Optionally, the target SN may send the first indication information or a part of the first indication information to the MN. For example, the T-SN may send a random access power threshold and/or a random access preamble transmission quantity threshold to the MN.

S1005. The MN sends an SN release request message to the S-SN.

S1006. The S-SN sends an SN release request acknowledgment message to the MN.

In a possible implementation, the MN releases a connection to the source SN. This procedure does not actually release the source SN, but mainly triggers the source SN to no longer send data to the UE.

S1007. The MN sends the first indication information to the UE.

The MN may send SN mobility configuration information to the UE in an RRC reconfiguration message (that is, a mobility configuration). The SN mobility configuration information includes the configuration information of the target SN.

Optionally, the RRC reconfiguration message may include the first indication information, and the first indication information indicates whether the UE is to record the mobility report. For example, if the first indication information indicates to the UE to record the mobility report, the UE records the mobility report; or if the first indication information indicates to the UE not to record the mobility report, the UE does not record the mobility report.

Optionally, the first indication information indicates to trigger the UE to record configuration information of the mobility report. For example, the configuration information may include at least one of a quality difference threshold, a quality threshold, a random access power threshold, and a random access preamble transmission quantity threshold. When the UE determines, based on the configuration information, that a trigger condition for recording the mobility report is met, the UE records the mobility report.

Optionally, in a possible implementation, the MN receives the first indication information or a part of the first indication information sent by the source SN. In an example, the information in the configuration information may be determined by the MN, or may be sent by the source SN to the MN. Optionally, when the source SN sends a part of the first indication information to the MN, the other part of the first indication information may be determined by the MN.

The mobility report may be a successful secondary base station mobility report (successful SN mobility report) or another report. In some embodiments of this application, an example in which the mobility report is a successful SN mobility report is used for description. By way of example rather than limitation, the successful SN mobility report is only used as a possible type of report of the mobility report.

S1008. The UE records the mobility report.

For specific steps, refer to the descriptions of step S907 in FIG. 9. Details are not described herein again.

It can be learned from the foregoing that related information in the mobility report includes information related to the master base station and/or the source secondary base station. However, because the UE cannot determine, in the SN mobility process, whether current SN change is triggered by the MN or the SN, the UE generally records only the information related to the MN, or records the information related to both the MN and the source SN. Optionally, the UE may record the information related to the MN or the information related to both the MN and the source SN in a protocol predefined manner. Alternatively, optionally, the MN may send third indication information to the UE. For example, the third indication information is carried in an RRC reconfiguration message. The third indication information indicates to the UE to record information related to the MN and/or the source SN, indicates whether the UE needs to record the information related to the MN, or indicates whether the UE needs to record the information related to the source SN. For descriptions of the information related to the MN and/or the source SN, refer to the descriptions in the embodiment in FIG. 9 of this application. Details are not described herein again. In some embodiments, the SN mobility is triggered by the source SN. In a possible implementation, the MN (which may also be referred to as a source MN) may indicate, based on the third indication information, the UE to record only the information related to the source SN, or not to record the information related to the MN.

S1014. The UE sends the mobility report to the MN.

By way of example rather than limitation, an example in which the UE sends the mobility report to the MN is used for description in some embodiments. Alternatively, the UE may send the mobility report to the source SN or another network device (an example of a first network device) different from the source SN.

Optionally, before the UE sends the mobility report to the MN, the method further includes step S1009 to step S1013:

S1009. The UE sends an RRC reconfiguration complete message to the MN.

It should be understood that the reconfiguration complete message may only indicate that the UE successfully applies a configuration in the RRC reconfiguration message in S1017, and does not indicate that the UE completes the connection to the target SN.

S1010. The MN sends an SN reconfiguration complete message to the T-SN, to notify the SN that the UE completes a reconfiguration.

S1011. The UE performs a random access procedure with the T-SN, to synchronize with the T-SN, to subsequently start data transmission.

S1012. The UE sends second indication information to the MN, where the second indication information indicates that the UE has stored a successful SN mobility report.

For specific descriptions of the second indication information, refer to step S830 in the embodiment corresponding to FIG. 8. Details are not described herein again.

S1013. The MN sends request information to the UE, to request the UE to report the successful SN mobility report.

Optionally, in some embodiments, content of the mobility report may further include:

UE identification information and/or UE verification information in the SN, where the UE identification information in the SN may include an identifier, such as an S-NG-RAN node UE XnAP ID or an SeNB UE X2AP ID, allocated by the source SN to the UE for identifying the UE on an interface between base stations, or a PCI and a C-RNTI of the UE in the source SN.

This section focuses on the UE identification information in the SN in the mobility report. The scenario in which the UE identification information in the SN may include the identifier allocated by the source SN to the UE for identifying the UE on an interface between base stations is applicable to a scenario in which the UE reports the report on the MN and an interface connection, related to the UE, between the MN and the source SN is not deleted. Therefore, the source SN may uniquely identify the UE based on the identifier that is of the UE in the source SN and that is used to identify the UE on the interface between the base stations.

For specific content of the mobility report, refer to the descriptions of step S913 in FIG. 9. Details are not described herein again.

Optionally, when the MN receives the mobility report sent by the UE in step S1014, the method may further include step S1015: The MN sends a part or all of information in the mobility report to the S-SN. Correspondingly, the source SN receives the part or all of information in the mobility report, and the source SN may configure (adjust or maintain) a corresponding mobility parameter based on the received information during next time of SN addition or change. For example, when there is an SN mobility failure or a possible SN mobility failure, the source SN may adjust a related parameter in an SN mobility process based on the received information, to implement network optimization. For example, adjusting the related parameter may include at least one of the following: PRACH resource adjustment, coverage adjustment, handover parameter adjustment, and beam adjustment.

Optionally, when the UE sends the mobility report to the source SN or another network device different from the source SN in S1014, the method may further include: The other network device may determine, based on the information related to the source SN in the mobility report, to forward a part or all of information in the mobility report to the source SN. Alternatively, the other network device may send a part or all of information in the mobility report to the source MN or the source SN. If the other network device sends the part or all of information in the mobility report to the source MN, this embodiment further includes: The source MN sends the part or all of information in the mobility report to the source SN.

Optionally, the MN, the other network device, or the source SN may send a part of information in the mobility report to the target SN, for example, send information related to the target SN. For the information related to the target SN, refer to descriptions in the embodiment in FIG. 9 of this application. Details are not described herein again.

Correspondingly, the source SN or the target SN receives the part or all of information in the mobility report, and the source SN or the target SN may configure (adjust or maintain) a corresponding mobility parameter based on the received part or all of information in the mobility report during next time of SN addition or change. For example, when there is an SN mobility failure or a possible SN mobility failure, the source SN or the target SN may adjust a related parameter in an SN mobility process based on the received information, to implement network optimization. For example, adjusting the related parameter in the SN mobility process may include at least one of the following: PRACH resource adjustment, coverage adjustment, handover parameter adjustment, and beam adjustment.

For a specific implementation of sending the part or all of information in the mobility report between any network devices in some embodiments, refer to the descriptions in the embodiment in FIG. 9. Details are not described herein again. In addition, any network devices in some embodiments may further send the mobility report or type information of the information related to the target SN to each other by using the foregoing direct or indirect sending mechanism.

If the source SN is in a CU-DU architecture, this embodiment further includes: A source SN CU sends a part or all the mobility report to a source SN DU.

Optionally, if the mobility report includes the random access information of the UE in the cell of the target SN, this embodiment further includes: The source MN sends the information related to the target SN to the target SN. The information related to the target SN is not described herein again.

It may be understood that if the target SN is in a CU-DU architecture, a target SN-CU further needs to send the part or all of information in the mobility report to a target SN-DU. Correspondingly, the DU receives the part or all of information in the mobility report, and the DU may configure (adjust or maintain) a corresponding mobility parameter based on the received mobility report during next time of SN addition or change. For example, when there is an SN mobility failure or a possible SN mobility failure, the DU may adjust, based on the received information, a related parameter of the target SN in an SN mobility process, to implement network optimization.

In the foregoing technical solution, a mechanism for SN-triggered mobility reporting and a mechanism for transmitting a mobility report between network devices are introduced, so that the source SN can identify a potential failure in a mobility reporting process, thereby improving the robustness of SN mobility.

In addition, a trigger mechanism for recording the mobility report by the UE is introduced, and is applicable to a handover scenario and an SN mobility scenario, to reduce energy consumption of the UE caused by recording a mobility report (for example, successful SN/MN mobility report) in the handover scenario or mobility scenario by the UE and signaling overheads for subsequently transmitting the report.

Embodiments described in this specification may be independent solutions, or may be combined based on internal logic. All these solutions fall within the protection scope of this application.

It may be understood that, in embodiments of this application, an example in which the MN sends the SN mobility configuration to the UE is used for description. However, this application is not limited to this implementation. For example, in an SN mobility scenario triggered by the source SN, alternatively, the source SN may send an SN mobility configuration to the UE. Correspondingly, an execution body in the embodiment corresponding to FIG. 10 in this application may be changed from the MN to the source SN. It may be understood that, that the execution body may be changed from the MN to the source SN may be directly replacing an execution body of each step, or may be changing an execution sequence of the steps or skipping some steps with reference to a scenario in which the source SN is an execution body.

It may be understood that in the foregoing method embodiments, procedures or steps implemented by a terminal device may also be implemented by a component (for example, a chip or a circuit) that can be disposed in the terminal device, and procedures or steps implemented by a network device (for example, the MN or the SN) may also be implemented by a component (for example, a chip or a circuit) that can be disposed in the network device.

The foregoing describes the method embodiments in the embodiments of this application with reference to the accompanying drawings, and the following describes apparatus embodiments in the embodiments of this application. It should be understood that the descriptions of the method embodiments may correspond to the descriptions of the apparatus embodiments. Therefore, for a part not described, refer to the foregoing method embodiments.

Figure 11:
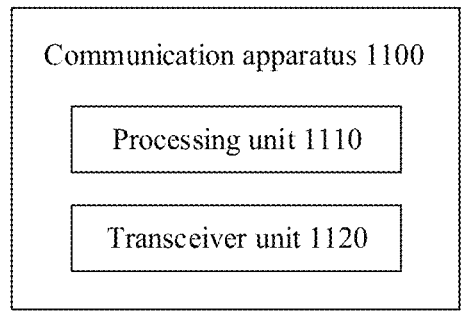
FIG. 11 is a schematic block diagram of a communication apparatus 1100 according to an embodiment of this application.

FIG. 11 is a schematic block diagram of a communication apparatus 1100 according to an embodiment of this application. The communication apparatus 1100 includes a transceiver unit 1120 and a processing unit 1110. The transceiver unit 1120 may receive and send information, and the processing unit 1110 is configured to perform data processing. The transceiver unit 1120 may also be referred to as a communication interface or a communication unit. The term "unit" may refer a hardware component or a software program or a hardware component running a software program. The hardware component may include one or more processors or processing circuits coupled with I/O interfaces or transmitting/receiving circuits.

Optionally, the communication apparatus 1100 may further include a storage unit. The storage unit may be configured to store instructions and/or data. The processing unit 1110 may read the instructions and/or the data in the storage unit.

The communication apparatus 1100 may be a terminal device, or may be a component (for example, a chip or a circuit) that can be disposed in the terminal device.

In one case, the communication apparatus 1100 may correspondingly implement operations or steps corresponding to the terminal device in the foregoing method embodiments. For example, the transceiver unit 1120 may be configured to perform a receiving or sending operation corresponding to the terminal device in the foregoing method embodiments, and the processing unit 1110 is configured to perform an internal processing operation corresponding to the terminal device in the foregoing method embodiments.

For example, in an embodiment, for example, in FIG. 8 to FIG. 10, the processing unit 1110 is configured to record a mobility report, where the mobility report includes information related to secondary network device mobility of a terminal device on which the communication apparatus is disposed, and the secondary network device mobility includes configuring the terminal device to add a target secondary network device and/or configuring the terminal device to change a secondary network device from a source secondary network device to a target secondary network device. The transceiver unit 1120 is configured to send the mobility report.

Optionally, before the mobility report is recorded, the transceiver unit 1120 is further configured to receive first indication information, where the first indication information indicates to the processing unit 1110 to record the mobility report.

Optionally, the first indication information indicates configuration information for triggering the processing unit 1110 to record the mobility report, where the configuration information includes at least one of the following parameters: a quality difference threshold, a quality threshold, a random access power threshold, and a random access preamble transmission quantity threshold.

Optionally, the processing unit 1110 is further configured to: record the mobility report when determining that an absolute value of a quality difference between a cell quality, corresponding to a first moment, of a cell of the target secondary network device and a cell quality, corresponding to a second moment, of the cell is greater than or equal to the quality difference threshold; record the mobility report when determining that an absolute value of a quality difference between a cell quality, corresponding to a first moment, of a cell of the source secondary network device and a cell quality, corresponding to a second moment, of the cell is greater than or equal to the quality difference threshold; record the mobility report when determining that cell quality of the cell of the target secondary network device at a third moment is less than or equal to the quality threshold; record the mobility report when determining that random access power for the target secondary network device is greater than or equal to the random access power threshold; and/or record the mobility report when determining that a quantity of random access preamble transmissions in a process of accessing the target secondary network device is greater than or equal to the random access preamble quantity.

Optionally, the first moment and the second moment include any two of the following moments: a moment at which the transceiver unit 1120 sends the cell quality of the cell of the target secondary network device; a moment at which the transceiver unit 1120 receives a secondary network device mobility configuration, where the secondary network device mobility configuration includes configuration information indicating to the terminal device, on which the apparatus is disposed, to add the target secondary network device, or the secondary network device mobility configuration includes configuration information indicating to the terminal device, on which the apparatus is disposed, to change the secondary network device from the source secondary network device to the target secondary network device; a moment at which the transceiver unit 1120 sends a secondary network device mobility configuration complete message; and a moment at which the processing unit 1110 completes random access to the target secondary network device. The third moment includes one of the following moments: the moment at which the transceiver unit 1120 receives the secondary network device mobility configuration, where the secondary network device mobility configuration indicates to the terminal device, on which the apparatus is disposed, to add the target secondary network device or to change a secondary network device from the source secondary network device to the target secondary network device; the moment at which the transceiver unit 1120 sends the secondary network device mobility configuration complete message; and the moment at which the processing unit 1110 completes random access to the target secondary network device.

Optionally, after the mobility report is recorded, the transceiver unit 1120 is further configured to send second indication information, where the second indication information indicates that the terminal device on which the apparatus is disposed has stored the mobility report.

Optionally, the transceiver unit 1120 is further configured to receive request information, where the request information requests the terminal device on which the apparatus is disposed to report the mobility report. The processing unit 1110 is further configured to send the mobility report based on the request information.

In some possible implementations, the transceiver unit 1120 may be an interface circuit, a pin, a transceiver, or the like. Optionally, the interface circuit may include an input circuit and an output circuit, and the processing unit 1110 may include a processing circuit or at least one processor. The storage unit may include at least one memory.

Optionally, the transceiver unit 1120 may be a radio frequency module. The processing unit 1120 may be a baseband module. The radio frequency module is mainly configured to receive and send radio frequency signals and perform conversion between a radio frequency signal and a baseband signal. The baseband module is mainly configured to perform baseband processing and the like.

It may be understood that the transceiver unit 1120, the processing unit 1110, and the storage unit may be independently disposed or exist, or may be all or partially integrated.

Figure 12:
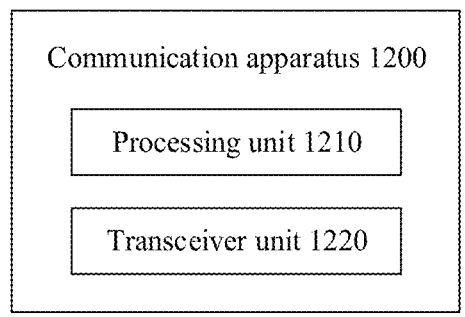
FIG. 12 is a schematic block diagram of a communication apparatus 1200 according to an embodiment of this application.

FIG. 12 is a schematic block diagram of a communication apparatus 1200 according to an embodiment of this application. The communication apparatus 1200 includes a transceiver unit 1220 and a processing unit 1210. The transceiver unit 1220 may receive and send information, and the processing unit 1210 is configured to perform data processing. The transceiver unit 1220 may also be referred to as a communication interface or a communication unit.

The communication apparatus 1200 may be a master network device, or may be a component (for example, a chip or a circuit) that can be disposed in the master network device.

Optionally, the communication apparatus 1200 may further include a storage unit. The storage unit may be configured to store instructions and/or data. The processing unit 1210 may read the instructions and/or the data in the storage unit.

In one case, the communication apparatus 1200 may correspondingly implement operations or steps corresponding to the master network device in the foregoing method embodiments. For example, the transceiver unit 1220 is configured to perform a receiving or sending operation corresponding to the master network device in the foregoing method embodiments, and the processing unit 1210 is configured to perform an internal processing operation corresponding to the master network device in the foregoing method embodiments.

For example, in an embodiment, for example, in FIG. 8 to FIG. 10, the transceiver unit 1220 is configured to receive a mobility report, where the mobility report includes information related to the secondary network device mobility of a terminal device, and the secondary network device mobility includes configuring the terminal device to add a target secondary network device and/or configuring the terminal device to change a secondary network device from a source secondary network device to a target secondary network device. The processing unit 1210 is adapted to configure a related parameter of the secondary network device mobility based on the mobility report, or send the mobility report to the secondary network device.

Optionally, before the transceiver unit receives the mobility report, the transceiver unit 1220 is further configured to send first indication information, where the first indication information indicates to the terminal device to record the mobility report.

Optionally, the first indication information indicates configuration information for triggering the terminal device to record the mobility report, where the configuration information includes at least one of the following parameters: a quality difference threshold, a quality threshold, a random access power threshold, and a random access preamble transmission quantity threshold.

Optionally, the transceiver unit 1220 is further configured to receive the configuration information sent by the secondary network device.

Optionally, the transceiver unit 1220 is further configured to: receive second indication information, where the second indication information indicates that the terminal device has stored the mobility report; and send request information, where the request information requests the terminal device to report the mobility report.

Optionally, the transceiver unit 1220 is further configured to receive the mobility report sent by a first network device, where the first network device is a network device that receives the mobility report sent by the terminal device.

In some possible implementations, the transceiver unit 1220 may be an interface circuit, a pin, a transceiver, or the like. Specifically, the interface circuit may include an input circuit and an output circuit, and the processing unit 1210 may include a processing circuit or at least one processor. The storage unit may include at least one memory.

Optionally, the transceiver unit 1220 may be a radio frequency module. The processing unit 1210 may be a baseband module. The radio frequency module is mainly configured to receive and send radio frequency signals and perform conversion between a radio frequency signal and a baseband signal. The baseband module is mainly configured to perform baseband processing, control a base station, and the like.

Figure 13:
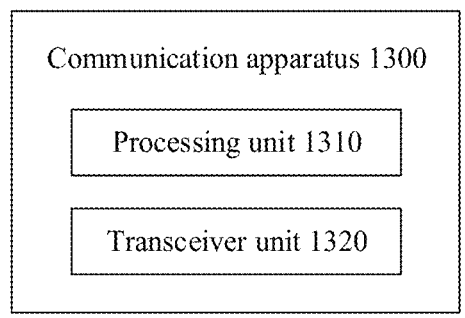
FIG. 13 is a schematic block diagram of a communication apparatus 1300 according to an embodiment of this application.

FIG. 13 is a schematic block diagram of a communication apparatus 1300 according to an embodiment of this application. The communication apparatus 1300 includes a transceiver unit 1320 and a processing unit 1310. The transceiver unit 1320 may receive and send information, and the processing unit 1310 is configured to perform data processing. The transceiver unit 1320 may also be referred to as a communication interface or a communication unit.

The communication apparatus 1300 may be a source secondary network device, or may be a component (for example, a chip or a circuit) that can be disposed in the source secondary network device.

Optionally, the communication apparatus 1300 may further include a storage unit. The storage unit may be configured to store instructions and/or data. The processing unit 1320 may read the instructions and/or the data in the storage unit.

In one case, the communication apparatus 1300 may correspondingly implement operations or steps corresponding to the source secondary network device in the foregoing method embodiments. For example, the transceiver unit 1320 is configured to perform a receiving or sending operation corresponding to the source secondary network device in the foregoing method embodiments, and the processing unit 1310 is configured to perform an internal processing operation corresponding to the source secondary network device in the foregoing method embodiments.

For example, the transceiver unit 1320 is configured to receive a mobility report, where the mobility report includes information related to the secondary network device mobility of a terminal device, and the secondary network device mobility includes configuring the terminal device to add a target secondary network device and/or configuring the terminal device to change a secondary network device from a source secondary network device to a target secondary network device. The processing unit 1310 is adapted to configure a related parameter of the secondary network device mobility based on the mobility report.

Optionally, before the transceiver unit 1320 receives the mobility report, the transceiver unit 1320 is further configured to send a first request message, where the first request message includes information indicating to the master network device to configure first indication information, and the first indication information indicates to the terminal device to record the mobility report.

Optionally, the first indication information indicates configuration information for triggering the terminal device to record the mobility report, where the configuration information includes at least one of the following parameters: a quality difference threshold, a quality threshold, a random access power threshold, and a random access preamble transmission quantity threshold.

Optionally, the transceiver unit 1320 is further configured to send the configuration information to the master network device.

Optionally, the transceiver unit 1320 is further configured to: receive the mobility report sent by the terminal device; receive the mobility report sent by the master network device; or receive the mobility report sent by a first network device, where the first network device is a network device to which the terminal device sends the mobility report.

In some possible implementations, the transceiver unit 1320 may be an interface circuit, a pin, a transceiver, or the like. Specifically, the interface circuit may include an input circuit and an output circuit, and the processing unit 1310 may include a processing circuit or at least one processor. The storage unit may include at least one memory.

Optionally, the transceiver unit 1320 may be a radio frequency module. The processing unit 1310 may be a baseband module. The radio frequency module is mainly configured to receive and send radio frequency signals and perform conversion between a radio frequency signal and a baseband signal. The baseband module is mainly configured to perform baseband processing and the like.

Figure 14:
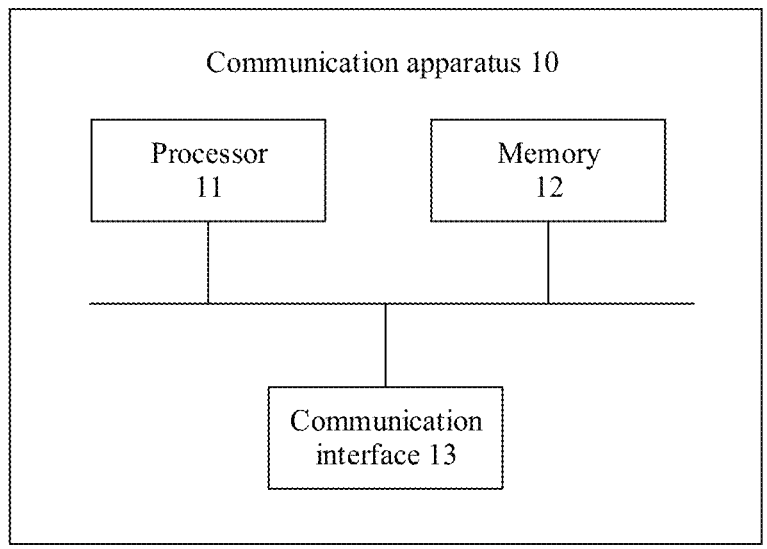
FIG. 14 is a schematic diagram of a structure of a communication apparatus 10 according to this application.

FIG. 14 is a schematic diagram of a structure of a communication apparatus 10 according to this application. As shown in FIG. 14, the communication apparatus 10 includes one or more processors 11, one or more memories 12, and one or more communication interfaces 13. The processor 11 is configured to control the communication interface 13 to send and receive signals, the memory 12 is configured to store a computer program, and the processor 11 is configured to invoke and run the computer program from the memory 12, to perform procedures and/or operations performed by the terminal device in the method embodiments of this application.

For example, the processor 11 may have a function of the processing unit 1110 shown in FIG. 11, and the communication interface 13 may have a function of the transceiver unit 1120 shown in FIG. 11. Specifically, the processor 11 may be configured to perform processing or operations internally performed by the terminal device in FIG. 8 to FIG.

10, and the communication interface 13 is configured to perform sending actions and/or receiving actions performed by the terminal device in FIG. 8 to FIG. 10. Details are not described again.

In an implementation, the communication apparatus 10 may be the terminal device in the method embodiments. In this implementation, the communication interface 13 may be a transceiver. The transceiver may include a receiver and a transmitter.

Optionally, the processor 11 may be a baseband apparatus, and the communication interface 13 may be a radio frequency apparatus.

In another implementation, the communication apparatus 10 may be a chip installed in the terminal device. In this implementation, the communication interface 13 may be an interface circuit or an input/output interface.

Figure 15:
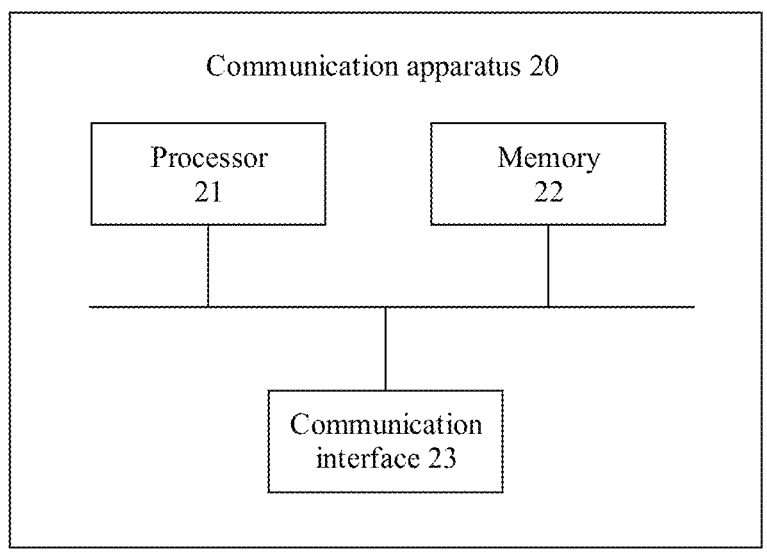
FIG. 15 is a schematic diagram of a structure of a communication apparatus 20 according to this application.

FIG. 15 is a schematic diagram of a structure of a communication apparatus 20 according to this application. As shown in FIG. 15, the communication apparatus 20 includes one or more processors 21, one or more memories 22, and one or more communication interfaces 23. The processor 21 is configured to control the communication interface 23 to send and receive signals, the memory 22 is configured to store a computer program, and the processor 21 is configured to invoke and run the computer program from the memory 22, to perform procedures and/or operations performed by the master network device in the method embodiments of this application.

For example, the processor 21 may have a function of the processing unit 1210 shown in FIG. 12, and the communication interface 23 may have a function of the transceiver unit 1220 shown in FIG. 12. Specifically, the processor 21 may be configured to perform processing or operations internally performed by the master network device in FIG. 8 to FIG. 10, and the communication interface 23 is configured to perform sending actions and/or receiving actions performed by the master network device in FIG. 8 to FIG. 10. Details are not described again.

Figure 16:
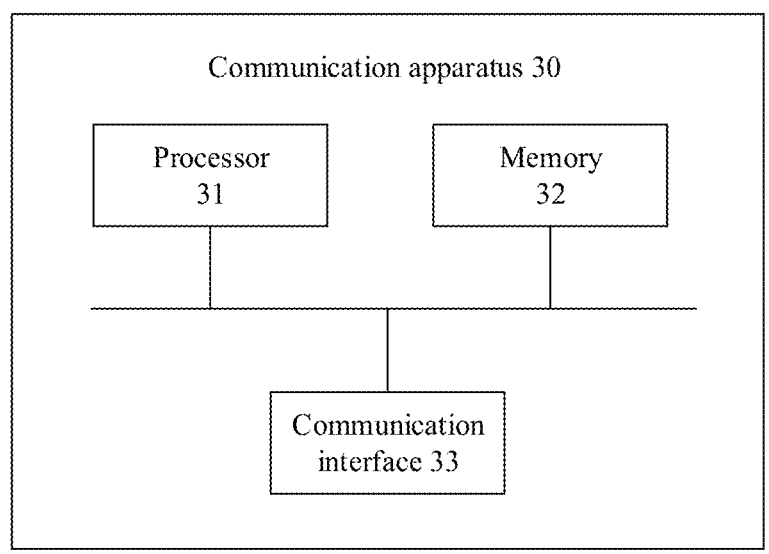
FIG. 16 is a schematic diagram of a structure of a communication apparatus 30 according to this application.

FIG. 16 is a schematic diagram of a structure of a communication apparatus 30 according to this application. As shown in FIG. 16, the communication apparatus 30 includes one or more processors 31, one or more memories 32, and one or more communication interfaces 33. The processor 31 is configured to control the communication interface 33 to send and receive signals, the memory 32 is configured to store a computer program, and the processor 31 is configured to invoke and run the computer program from the memory 32, to perform procedures and/or operations performed by the source secondary network device in the method embodiments of this application.

For example, the processor 31 may have a function of the processing unit 1310 shown in FIG. 13, and the communication interface 23 may have a function of the transceiver unit 1320 shown in FIG. 13. Specifically, the processor 31 may be configured to perform processing or operations internally performed by the source secondary network device in FIG. 9 to FIG. 10, and the communication interface 33 is configured to perform sending actions and/or receiving actions performed by the source secondary network device in FIG. 9 and FIG. 10. Details are not described again.

Optionally, the memory and the processor in the foregoing apparatus embodiments may be physically independent units, or the memory may be integrated into the processor. This is not limited in this application.

In addition, this application further provides a computer-readable storage medium. The computer-readable storage medium stores computer instructions. When the computer instructions are run on a computer, the computer is enabled to perform the operation and/or procedure performed by the terminal device in the method embodiments of this application.

This application further provides a computer-readable storage medium. The computer-readable storage medium stores computer instructions. When the computer instructions are run on a computer, the computer is enabled to perform an operation and/or a procedure performed by the master network device in the method embodiments of this application.

This application further provides a computer program product. The computer program product includes computer program code or instructions. When the computer program code or the instructions are run on a computer, the computer is enabled to perform an operation and/or a procedure performed by the terminal device in the method embodiments of this application.

This application further provides a computer program product. The computer program product includes computer program code or instructions. When the computer program code or the instructions are run on a computer, the computer is enabled to perform an operation and/or a procedure performed by the master network device in the method embodiments of this application.

In addition, this application further provides a chip. The chip includes a processor. A memory configured to store a computer program is disposed independent of the chip. The processor is configured to execute the computer program stored in the memory, to perform operations and/or processing performed by the terminal device in any method embodiment.

Further, the chip may include a communication interface. The communication interface may be an input/output interface, an interface circuit, or the like. Further, the chip may include the memory.

This application further provides a chip. The chip includes a processor. A memory configured to store a computer program is disposed independent of the chip. The processor is configured to execute the computer program stored in the memory, to perform operations and/or processing performed by the master network device in any method embodiment.

Further, the chip may include a communication interface. The communication interface may be an input/output interface, an interface circuit, or the like. Further, the chip may include the memory.

In addition, this application further provides a wireless communication system, including some or all of the master network device, the source secondary network device, the target secondary network device, and the terminal device in embodiments of this application.

The processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through examples but not limitative description, RAMs in many forms are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory of the systems and methods described in this specification includes but is not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

The term "and/or" in this application describes only an association relationship for describing associated objects and represents that there may be three relationships. For example, A and/or B may represent the following three cases: Only A exists, both A and B exist, and only B exists. A, B, and C each may be singular or plural. This is not limited.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application.

What is claimed is:

1. A communication method, comprising:
receiving third indication information from a source secondary network device or a master network device, wherein the third indication indicates secondary network device mobility is triggered by the master network device or the source secondary network device;
recording a mobility report, wherein the mobility report comprises information related to the secondary network device mobility of a terminal device, and the secondary network device mobility includes adding a target secondary network device to a configuration of the terminal device or changing a secondary network device from a source secondary network device to a target secondary network device in the configuration of the terminal device, and wherein the mobility report comprises information related to the master network device when the third indication information indicates the secondary network device mobility is triggered by the master network device, and the mobility report comprises information related to the source secondary network device when the third indication information indicates the secondary network device mobility is triggered by the source secondary network device; and
sending the mobility report.

2. The method according to claim 1, wherein the method further comprises:

receiving first indication information, wherein the first indication information indicates configuration information for triggering recording of the mobility report.

3. The method according to claim 2, wherein the recording of a mobility report comprises:
   recording the mobility report when it is determined that an absolute value of a quality difference between a cell quality, at a first moment, of a cell of the target secondary network device and a cell quality, at a second moment, of the cell is greater than or equal to the quality difference threshold;
   recording the mobility report when it is determined that a cell quality of the cell of the target secondary network device at a third moment is less than or equal to the quality threshold;
   recording the mobility report when it is determined that a random access power for the target secondary network device is greater than or equal to a random access power threshold; or
   recording the mobility report when it is determined that a quantity of random access preamble transmissions in a process of accessing the target secondary network device is greater than or equal to the random access preamble transmission quantity threshold.

4. The method according to claim 3, wherein the first moment and the second moment are any two moments selected from the following:
   a moment at which the terminal device reports a cell quality of the cell of the target secondary network device;
   a moment at which the terminal device receives a secondary network device mobility configuration, wherein the secondary network device mobility configuration comprises configuration information indicating to the terminal device to add the target secondary network device, or the secondary network device mobility configuration comprises configuration information indicating to the terminal device to change the secondary network device from the source secondary network device to the target secondary network device;
   a moment at which the terminal device sends a secondary network device mobility configuration complete message; and
   a moment at which the terminal device completes random access to the target secondary network device; and
   the third moment comprises one of the following moments:
   the moment at which the terminal device receives the secondary network device mobility configuration;
   the moment at which the terminal device sends the secondary network device mobility configuration complete message; and
   the moment at which the terminal device completes random access to the target secondary network device.

5. The method according to claim 2, wherein the receiving first indication information comprises:
   receiving the first indication information from the source secondary network device or a master network device.

6. The method according to claim 1, wherein the mobility report comprises at least of the following: cell information of a cell of a master network device, cell information of a cell of a source secondary network device, cell information of the target secondary network device, or random access information of the terminal device in a cell of the target secondary network device.

7. The method according to claim 1, wherein the third indication information indicates to the terminal device to record information related to the master network device or the source secondary network device, indicates whether the terminal device needs to record the information related to the master network device, or indicates whether the terminal device needs to record the information related to the source secondary network device.

8. The method according to claim 1, wherein after recording a mobility report, the method further comprises:
   sending second indication information, wherein the second indication information indicates that the mobility report is stored.

9. The method according to claim 1, wherein the method further comprises:
   receiving request information, wherein the request information requests the mobility report; and
   the sending of the mobility report comprises:
   sending the mobility report based on the request information.

10. A communication method, comprising:
    sending, to a terminal device, third indication information from a master network device, wherein the third indication indicates secondary network device mobility is triggered by the master network device or a source secondary network device, and wherein a mobility report comprises information related to the master network device when the third indication information indicates the secondary network device mobility is triggered by the master network device, and the mobility report comprises information related to the source secondary network device when the third indication information indicates the secondary network device mobility is triggered by the source secondary network device;
    receiving, by the master network device, the mobility report, wherein the mobility report comprises information related to the secondary network device mobility of the terminal device, and the secondary network device mobility comprises adding a target secondary network device to a configuration of the terminal device or changing a secondary network device from a source secondary network device to a target secondary network device in the configuration of the terminal device; and
    configuring, by the master network device, a related parameter of the secondary network device mobility based on the mobility report, or sending, by the master network device, the mobility report to the source secondary network device.

11. The method according to claim 10, wherein before receiving, by the master network device, the mobility report, the method further comprises:
    sending, by the master network device, first indication information, wherein the first indication information indicates configuration information for triggering recording of the mobility report.

12. The method according to claim 11, wherein the master network device receives the first indication information from the secondary network device.

13. The method according to claim 10, further comprising:
    receiving, by the master network device, second indication information, wherein the second indication information indicates that the terminal device has stored the mobility report; and
    sending, by the master network device, request information, wherein the request information requests the terminal device to report the mobility report.

14. The method according to claim 10, wherein the receiving, by a master network device, a mobility report comprises:
receiving, by the master network device, the mobility report from a first network device that receives the mobility report from the terminal device.

15. The method according to according to claim 10, further comprising: sending a third indication information to the terminal device, wherein the third indication information indicates to the terminal device to record information related to the master network device or the source secondary network device, indicates whether the terminal device needs to record the information related to the master network device, or indicates whether the terminal device needs to record the information related to the source secondary network device.

16. A communication apparatus, comprising at least one circuitry configured to:
receive third indication information from a source secondary network device or a master network device, wherein the third indication indicates secondary network device mobility is triggered by the master network device or the source secondary network device;
record a mobility report, wherein the mobility report comprises information related to the secondary network device mobility of a terminal device, and the secondary network device mobility comprises adding a target secondary network device in a configuration of the terminal device or changing a secondary network device from the source secondary network device to a target secondary network device in the configuration of the terminal device, and wherein the mobility report comprises information related to the master network device when the third indication information indicates the secondary network device mobility is triggered by the master network device, and the mobility report comprises information related to the source secondary network device when the third indication information indicates the secondary network device mobility is triggered by the source secondary network device; and
send the mobility report.

17. The apparatus according to claim 16, wherein the at least one circuitry is further configured to:
receive first indication information, wherein the first indication information indicates configuration information for triggering recording of the mobility report.

18. The apparatus according to claim 17, wherein the first indication information is received from the source secondary network device or a master network device.

19. The apparatus according to claim 16, wherein the mobility report comprises at least one selected from the following: cell information of a cell of a master network device, cell information of a cell of the source secondary network device, cell information of the target secondary network device, or random access information of the terminal device in a cell of the target secondary network device.

20. The apparatus according to claim 16, wherein the third indication information indicates to the terminal device to record information related to the master network device or the source secondary network device, indicates whether the terminal device needs to record the information related to the master network device, or indicates whether the terminal device needs to record the information related to the source secondary network device.

\* \* \* \* \*